United States Patent
Peleg et al.

(10) Patent No.: US 8,593,506 B2
(45) Date of Patent: Nov. 26, 2013

(54) METHOD AND SYSTEM FOR FORMING A PANORAMIC IMAGE OF A SCENE HAVING MINIMAL ASPECT DISTORTION

(75) Inventors: Shmuel Peleg, Mevasseret Zion (IL); Alex Rav-Acha, Ramat Denia (IL); Giora Engel, Mevasseret Zion (IL)

(73) Assignee: Yissum Research Development Company of the Hebrew University of Jerusalem, Jerusalem (IL)

( * ) Notice: Subject to any disclaimer, the term of this patent is extended or adjusted under 35 U.S.C. 154(b) by 844 days.

(21) Appl. No.: 12/530,064

(22) PCT Filed: Mar. 13, 2008

(86) PCT No.: PCT/IL2008/000356
§ 371 (c)(1),
(2), (4) Date: Sep. 4, 2009

(87) PCT Pub. No.: WO2008/111080
PCT Pub. Date: Sep. 18, 2008

(65) Prior Publication Data
US 2011/0043604 A1    Feb. 24, 2011

Related U.S. Application Data

(60) Provisional application No. 60/894,946, filed on Mar. 15, 2007, provisional application No. 60/945,338, filed on Jun. 20, 2007.

(51) Int. Cl.
*G06K 9/00*    (2006.01)
*H04N 7/00*    (2011.01)

(52) U.S. Cl.
USPC ............. 348/36; 382/154; 382/294; 382/284

(58) Field of Classification Search
USPC .............................. 348/36; 382/284, 294, 154
See application file for complete search history.

(56) References Cited

U.S. PATENT DOCUMENTS 5,850,352 A * 12/1998 Moezzi et al. ................. 345/419
6,078,701 A *  6/2000 Hsu et al. ...................... 382/294
(Continued)

FOREIGN PATENT DOCUMENTS

WO    WO 99/06943    2/1999
WO    WO 2008/111080    9/2008

OTHER PUBLICATIONS

International Search Report issued Jul. 24, 2008 in International Application No. PCT/IL2008/000356.

(Continued)

*Primary Examiner* — Alina N. Boutah
(74) *Attorney, Agent, or Firm* — Stoel Rives LLP

(57) ABSTRACT

A panoramic image is generated from a sequence of input frames captured by a camera that translates relative to a scene having at least two points at different distances from the camera. A processor (13) is responsive to optical flow between corresponding points in temporally different input frames for computing flow statistics for at least portions of some of the input frames and for computing respective stitching costs between some of the portions and respective neighboring portions thereof. A selection unit (18) selects a sequence of portions and respective neighboring portions that minimizes a cost function that is a function of the flow statistics and stitching costs. A stitching unit (21) stitches the selected portions and respective neighboring portions so as to form a panoramic image of the scene, which may then be displayed or post-processed.

20 Claims, 17 Drawing Sheets

(56) References Cited

U.S. PATENT DOCUMENTS

| | | | |
|---|---|---|---|
| 6,157,747 A * | 12/2000 | Szeliski et al. | 382/284 |
| 6,532,036 B1 * | 3/2003 | Peleg et al. | 348/36 |
| 6,665,003 B1 | 12/2003 | Peleg et al. | |
| 6,813,391 B1 * | 11/2004 | Uyttendaele et al. | 382/284 |
| 6,956,603 B2 * | 10/2005 | Fujii | 348/169 |
| 7,006,124 B2 | 2/2006 | Peleg et al. | |
| 7,110,617 B2 * | 9/2006 | Zhang et al. | 382/284 |
| 8,102,406 B2 * | 1/2012 | Peleg et al. | 345/629 |
| 2002/0061131 A1 * | 5/2002 | Sawhney et al. | 382/154 |
| 2002/0135672 A1 * | 9/2002 | Sezan et al. | 348/36 |
| 2003/0184778 A1 | 10/2003 | Chiba | |
| 2004/0022419 A1 * | 2/2004 | Kesaniemi | 382/107 |
| 2005/0275727 A1 * | 12/2005 | Lai et al. | 348/208.1 |
| 2006/0177150 A1 * | 8/2006 | Uyttendaele et al. | 382/284 |
| 2006/0187305 A1 * | 8/2006 | Trivedi et al. | 348/169 |
| 2006/0228002 A1 * | 10/2006 | Zitnick et al. | 382/107 |
| 2008/0187172 A1 * | 8/2008 | Otsu et al. | 382/103 |
| 2009/0303312 A1 * | 12/2009 | Di Bernardo et al. | 348/36 |
| 2010/0238266 A1 * | 9/2010 | Jojic et al. | 348/36 |
| 2010/0272311 A1 * | 10/2010 | Nir et al. | 382/100 |

OTHER PUBLICATIONS

Agarwala, et al, *Photographing Long Scenes with Multi-Viewpoint Panoramas*, ACM Trans. Graph, 25(3):853-861, 2006.

Buehler, et al, *Unstructured Lumigraph Rendering*, SIGGRAPH 2001.

Lucas-Kanada Method, Wikipedia, XP-002488219, Jul. 15, 2008.

Ono, et al, *Ego-Motion Estimation for Efficient City Modeling by Using Epipolar Plane Range Image Analysis*, in ITSWC2003, Nov. 2003.

Rav-Acha, et al, *A Unified Approach for Motion Analysis and View Synthesis*, in Second IEEE International Symposium on 3D Data Processing, Visualization, and Transmission (3DPVT), Thessaloniki, Greece, Sep. 2004.

Rav-Acha, et al, *Mosaicing with Parallax Using Time Warping*, in Second IEEE Workshop on Image and Video Registration, Washington, DC, Jul. 2004.

Roman, et al, *Automatic Multiperspective Images*, in Proceedings of Eurographics Symposium on Rendering, pp. 161-171, 2006.

Roman, et al, *Interactive Design of Multi-Perspective Images for Visualizing Urban Landscapes*, in IEEE Visualization 2004, pp. 537-544, Oct. 2004.

Wexler, et al, *Space-Time Scene Manifolds*, in ICCV'05, vol. 1, pp. 858-863, 2005.

Zheng, *Digital Route Panoramas*, IEEE Multimedia, 7(2):7-10, Apr.-Jun. 2000.

Zhu, et al, *Generalized Parallel-Perspective Stereo Mosaics from Airborne Video*, PAMI, 26(2):226-237, Feb. 2004.

Zomet, et al, *Mosaicing New Views: The Crossed-Slits Projection*, PAMI, pp. 741-754, Jun. 2003.

\* cited by examiner

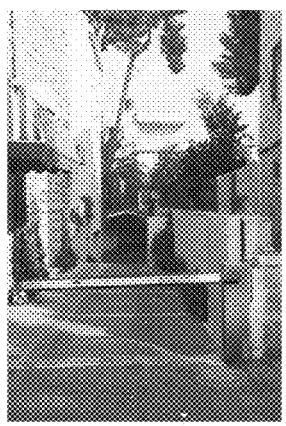  
FIG. 1a  FIG. 1b  FIG. 1c
 
FIG. 1d  FIG. 1e

 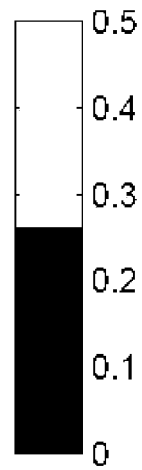
FIG. 10
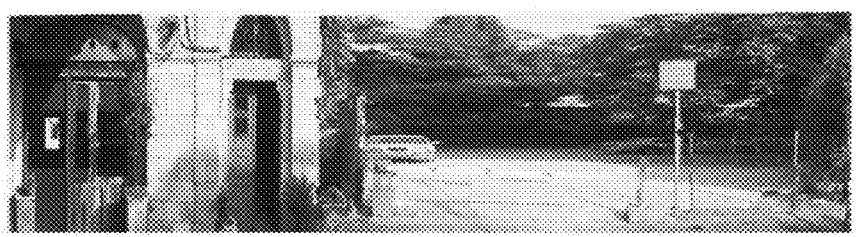
FIG. 11a
FIG. 11b

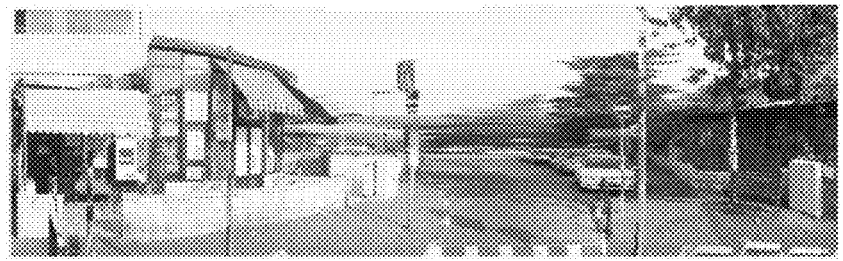
FIG. 11c
FIG. 11d
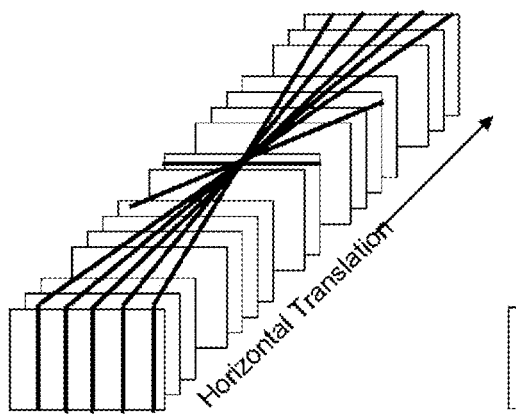 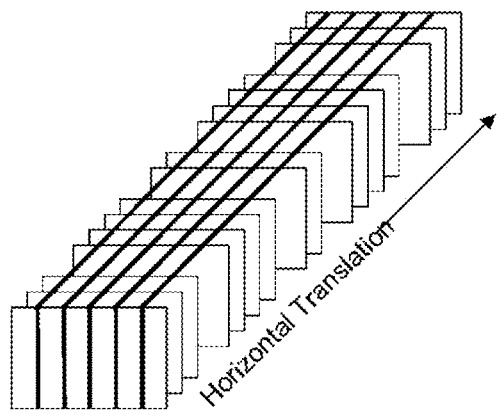
FIG. 13a  FIG. 13b

 
FIG. 14a  FIG. 14b
FIG. 15a
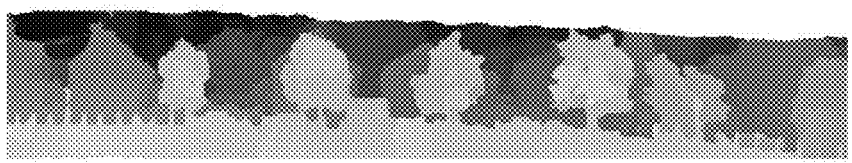
FIG. 15b
FIG. 16

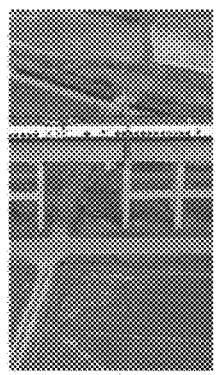 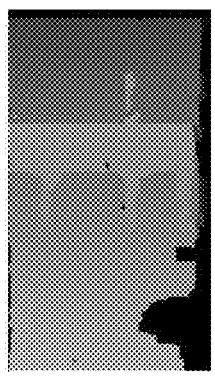 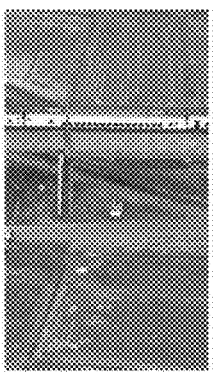 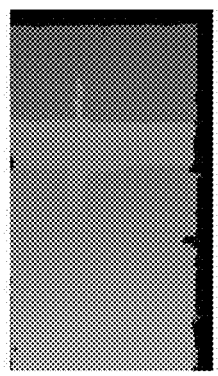
FIG. 17b  FIG. 17c  FIG. 17d  FIG. 17e
 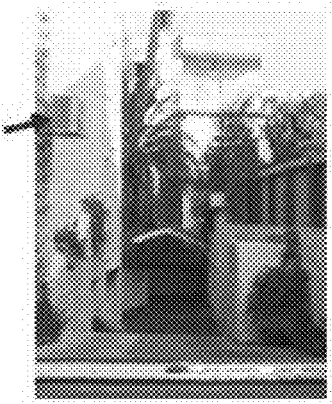
FIG. 18a  FIG. 18b
 
FIG. 18c  FIG. 18d

METHOD AND SYSTEM FOR FORMING A PANORAMIC IMAGE OF A SCENE HAVING MINIMAL ASPECT DISTORTION

RELATED APPLICATIONS

This application claims benefit of U.S. provisional application Ser. No. 60/894,946 filed Mar. 15, 2007 and 60/945,338 filed Jun. 20, 2007 whose contents are included herein by reference.

FIELD OF THE INVENTION

The invention relates generally to the field of image and video mosaicing and in particular to the presentation of mosaic images having perceived depth.

PRIOR ART

Prior art references considered to be relevant as a background to the invention are listed below and their contents are incorporated herein by reference. Additional references are mentioned in the above-mentioned U.S. provisional application Nos. 60/894,946 and 60/945,338 and their contents are incorporated herein by reference. Acknowledgement of the references herein is not to be inferred as meaning that these are in any way relevant to the patentability of the present invention. Each reference is identified by a number enclosed in square brackets and accordingly the prior art will be referred to throughout the specification by numbers enclosed in square brackets.

[1] A. Agarwala, M. Agrawala, M. Cohen, D. Salesin, and R. Szeliski. *Photographing long scenes with multi-viewpoint panoramas. ACM Trans. Graph.,* 25(3):853-861, 2006.
[2] J. Bergen, P. Anandan, K. Hanna, and R. Hingorani. *Hierarchical model-based motion estimation.* In *ECCV,* pages 237-252, 1992.
[3] S. Birchfield and C. Tomasi. *A pixel dissimilarity measure that is insensitive to image sampling. PAMI,* 20(4):401-406, 1998.
[4] S. Birchfield and C. Tomasi. *Multiway cut for stereo and motion with slanted surfaces.* In *ICCV,* volume 1, pages 489-495, 1999.
[5] Y. Boykov, O. Veksler, and R. Zabih. *Fast approximate energy minimization via graph cuts. PAMI,* 23(11):1222-1239, 2001.
[6] S. Gortler, R. Grzeszczuk, R. Szeliski, and M. Cohen. *The lumigraph.* SIGGRAPH, 30:43-54, 1996.
[7] K. Hanna. *Direct multi-resolution estimation of ego-motion and structure from motion.* In MOTION91, pages 156-162, 1991.
[8] R. Hartley and A. Zisserman. *Multiple View Geometry.* Cambridge University Press, second edition, 2004.
[9] L. Hong and G. Chen. *Segment-based stereo matching using graph cuts.* In CVPR, volume 1, pages 74-81, Los Alamitos, Calif., USA, 2004.
[10] M. Irani, P. Anandan, and M. Cohen. *Direct recovery of planar-parallax from multiple frames.* PAMI, 24(11):1528-1534, November 2002.
[11] M. Irani, B. Rousso, and S. Peleg. *Detecting and tracking multiple moving objects using temporal integration.* In ECCV'92, pages 282-287, 1992.
[12] V. Kolmogorov and R. Zabih. *Computing visual correspondence with occlusions via graph cuts.* In ICCV, volume 2, pages 508-515, July 2001.
[13] M. Levoy and P. Hanrahan. *Light field rendering.* SIGGRAPH, 30:31-42, 1996.
[14] S. Ono, H. Kawasaki, K. Hirahara, M. Kagesawa, and K. Ikeuchi. *Ego-motion estimation for efficient city modeling by using epipolar plane range image.* In ITSWC2003, November 2003.
[15] A. Rav-Acha and S. Peleg. *A unified approach for motion analysis and view synthesis.* In Second IEEE International Symposium on 3D Data Processing Visualization, and Transmission (3DPVT), Thessaloniki, Greece, September 2004.
[16] A. Rav-Acha, Y. Shor, and S. Peleg. *Mosaicing with parallax using time warping.* In Second IEEE Workshop on Image and Video Registration, Washington, D.C., July 2004.
[17] A. Román, G. Garg, and M. Levoy. *Interactive design of multi-perspective images for visualizing urban landscapes.* In IEEE Visualization 2004, pages 537-544, October 2004.
[18] A. Román and H. P. A. Lensch. *Automatic multiperspective images.* In Proceedings of Eurographics Symposium on Rendering, pages 161-171, 2006.
[19] M. Shi and J. Y. Zheng. *A slit scanning depth of route panorama from stationary blur.* In CVPR'05, volume 1, pages 1047-1054, 2005.
[20] Y. Wexler and D. Simakov. *Space-time scene manifolds.* In ICCV'05, volume 1, pages 858-863, 2005.
[21] J. Y. Zheng. *Digital route panorama.* IEEE Multimedia, 7(2):7-10, April-June 2000.
[22] Z. Zhu, E. Riseman, and A. Hanson. *Generalized parallel-perspective stereo mosaics from airborne videos.* PAMI, 26(2):226-237, February 2004.
[23] A. Zomet, D. Feldman, S. Peleg, and D. Weinshall. *Mosaicing new views: The crossed-slits projection.* PAMI, pages 741-754, June 2003.
[24] U.S. Pat. No. 7,006,124. Generalized panoramic mosaic.
[25] U.S. Pat. No. 6,665,003, System and method for generating and displaying panoramic images and movies.
[26] US2007003034 Apparatus and method for capturing a scene using staggered triggering of dense camera arrays.
[27] Chris Buehler, Michael Bosse, Leonard McMillan, Steven Gortler, Michael Cohen, *Unstructured lumigraph rendering,* SIGGRAPH 2001.

BACKGROUND OF THE INVENTION

Many mosaicing applications involve long image sequences taken by translating cameras scanning a long scene. Thus applications are known that include a video camera mounted on a vehicle scanning city streets [14,1,17,21,19], or a video camera mounted on a low altitude aircraft scanning a terrain [22]. Earlier versions of our work on ego-motion computation for sideways moving cameras were proposed in [16,15]. They had initialization and robustness problems that are addressed in this patent. In addition, they did not address the computation of dense depth maps and the creation of undistorted mosaics.

In [1,17] methods are described for creating a multi-perspective panorama. These methods recover camera motion using structure-from-motion [8], matching features between pairs of input images. Matched points are used to recover the camera parameters as well as a sparse cloud of 3D scene points, recovery that is much easier when fisheye lens are used as in [1]. Feature points as used in the above-described approaches will be preferred in clean, high contrast, and unambiguous imagery. However, direct methods may be preferred when feature points are rare, ambiguous, or noisy.

Image mosaicing can be regarded as a special case of creating a model of the observed scene. Having multiple images of the scene theoretically enables both the computation of camera parameters and the geometric and photometric structure of the scene. As the mosaicing process is much simpler than the creation of a scene model, it is likely to work in more cases. Mosaicing works especially well when long scenes are involved, with camera motion only in one direction. Even when a scene model has successfully been constructed, the generation of a very long panoramic image of the entire scene, having minimum distortion, is a challenging problem.

Also known in this field is X-Slits mosaicing [23] one of whose declared benefits is its reduced distortion compared to pushbroom projection. But for mosaics that are spatially very long, the X-Slits images become very close to pushbroom projection with its significant distortions. Attempts to reduce the distortion of the spatially long mosaic were presented in [17,18] using different X-Slits projections for different scene segments. Also relevant is [20], where a mosaic image is generated by minimizing a stitching cost using dynamic programming. Other papers on mosaicing of long scenes include [19,21], where long mosaics are generated from a narrow slit scanning a scene. In these papers the camera is assumed to move slowly in a roughly constant velocity, and the scene depth can be estimated from stationary blur. In [2] a long panorama is stitched from a sparse set of still images, mainly addressing stitching errors.

Panoramic images of long scenes, generated from images taken by a translating camera, are normally distorted compared to perspective images. When large image segments are used for stitching a panoramic image, each segment is perspective but the seams between images are apparent due to depth parallax. When narrow strips are used the panoramic image is seamless, but its projection is normally pushbroom, having aspect distortions. The distortions become very significant when the variations in scene depth are large compared to the distance from the camera.

US 2007/003034 (Wilburn et al.) [26] discloses an apparatus and method for video capture of a three-dimensional region of interest in a scene using an array of video cameras positioned for viewing the three-dimensional region of interest in the scene from their respective viewpoints. A triggering mechanism is provided for staggering the capture of a set of frames by the video cameras of the array. A processing unit combines and operates on the set of frames captured by the array of cameras to generate a new visual output, such as high-speed video or spatio-temporal structure and motion models, that has a synthetic viewpoint of the three-dimensional region of interest. The processing involves spatio-temporal interpolation for determining the synthetic viewpoint space-time trajectory. Wilburn et al. do not generate panoramic images, but only new perspective images. Also, all cameras in the array are synchronized, and combination is done only on a set of frames captured simultaneously.

SUMMARY OF THE INVENTION

In accordance with one aspect of the invention, there is provided a computer-implemented method for forming a panoramic image of a scene from a sequence of input frames captured by a camera having an optical center that translates relative to the scene, said scene having at least two points at different distances from a path of said optical center, said method comprising:
 obtaining an optical flow between corresponding points in temporally different input frames;
 using said optical flow to compute flow statistics for at least portions of some of said input frames;
 using said optical flow to compute respective stitching costs between some of said portions and respective neighboring portions thereof;
 identifying a sequence of selected portions and respective neighboring portions that minimizes a cost function that is a function of the flow statistics and the stitching costs; and
 stitching the selected portions and respective neighboring portions so as to form a panoramic image of the scene.

In accordance with another aspect of the invention, there is provided a system for forming a panoramic image of a scene from a sequence of input frames captured by a camera having an optical center that translates relative to the scene, said scene having at least two points at different distances from a path of said optical center, said system comprising:
 a memory for storing an optical flow between corresponding points in temporally different input frames;
 a processing unit coupled to said memory and responsive to said optical flow for computing flow statistics for at least portions of some of said input frames and for computing respective stitching costs between some of said portions and respective neighboring portions thereof;
 a selection unit coupled to the processing unit for selecting a sequence of portions and respective neighboring portions that minimizes a cost function that is a function of the flow statistics and the stitching costs; and
 a stitching unit coupled to the selection unit for stitching the selected portions and respective neighboring portions so as to form a panoramic image of the scene.

The invention thus provides a direct method and system to compute camera motion and dense depth that are needed for the above-mentioned mosaicing applications. The computed motion and depth information are used for two visualization approaches. (i) a new Minimal Aspect Distortion (MAD) mosaicing of the scene. (ii) an immersive 3D visualization, allowing interactive changes of viewpoint and viewing direction, using X-Slits [23].

In accordance with another aspect of the invention, there is provided a system allowing panoramic mosaics to be generated from multiple videos uploaded by multiple people. The system allows people to take videos at different locations using conventional cameras or cellular telephones having video features and to upload their videos over the Internet to an application web server. The web server is programmed according to the invention to construct a model of the world by creating panoramic mosaics by stitching selected portions of the uploaded videos and optionally to display the generated world model on a display device.

While the proposed computation of camera motion is accurate, depth may not be computed accurately for many scene points. Occlusions, low contrast, varying illumination, and reflections will always leave many scene points with no depth values, or even with a wrong depth. While model based rendering may fail when depth is not accurate everywhere, image based rendering such as MAD mosaicing and X-Slits projection use only statistics of depth, and can overcome these problems.

The proposed approach can use only image data, and does not require external motion information. If motion and/or depth information is available, e.g. GPS or laser scanners, [14], it could be used to replace or enhance the motion computation part and/or the flow statistics.

For depth computation we use a variation of the iterative graph cuts approach as described in [12], which is based on [5]. Instead of extracting constant disparities, we segment the image into planar surfaces. Combining the graph cuts approach with planar surfaces was described in [4,9]. The main differences between [4] and the method according to the invention is in the initialization of the planar surfaces and in the extension of the two-frames algorithm to long un-stabilized sequences. A more detailed discussion can be found in Section 7.

The effectiveness of the proposed approach is demonstrated by processing several videos sequences taken from moving cars and from helicopters. Using X-Slits, different views from different virtual viewing locations are presented. The new MAD mosaicing is shown to significantly reduce aspect distortions when applied to long scenes having large depth variability.

The motion and depth computation according to the present invention is closely related to many intensity based ("direct") ego motion computations such as [10]. While these methods recover unrestricted camera motions, they are relevant only for short sequences since they require an overlapping region to be visible in all frames. For mosaicing long sequences, a robust motion computation method is required, which can also handle degenerate cases where general motion can not be recovered. In particular, the algorithm should give realistic mosaic images even when no 3D information is available in large portions of the scene.

In Section 4 we present "MAD Mosaicing", which is a long mosaic having minimum aspect distortions. It is based on the observation that only the perspective projection is undistorted in a scene with large depth variations, while for a scene at a constant depth almost any projection can give an undistorted mosaic. MAD mosaicing changes the panoramic projection depending on scene structure at each location, minimizing two costs: a distortion cost and a stitching cost. Minimization is done using dynamic programming.

An alternative to MAD mosaicing is the X-Slits projection, as described in Section 5. Even though X-Slits images are more distorted, they enable the viewpoint to be controlled and fly-through sequences to be created. In this case the depth information is mostly needed when handling large displacements, when the stitching process requires better interpolation.

Knowledge of camera motion and dense depth is needed for mosaicing, and this information can be provided by any source. The invention proposes a robust approach, alternating between direct ego-motion computation (Section 2) and depth computation (Section 1). This results in a robust method to compute both motion and depth, which can overcome large disparities, moving objects, etc. A general description of the alternation between motion and depth computation is described in Section 3.

By limiting our analysis to the most common case of a camera moving mostly sideways, motion and depth can be computed robustly for otherwise ambiguous sequences. We can robustly handle cameras mounted on moving cars and scanning city streets, down-looking cameras scanning the ground from a low altitude aircraft, etc. The camera is allowed to rotate, as rotations are common in such cases due to the vibrations of the vehicle, and the focal length of the camera lens may also change.

The computation of camera motion uses a simple variation of the Lucas-Kanade method [2] that takes into account the estimated scene depth. Given the estimated motion, depth is computed using a graph cuts approach to detect planar surfaces in the scene. In long image sequences, planar surfaces that were computed for previous frames are used as priors for the new frames, increasing robustness. Additional robustness is achieved by incorporating a flexible pixel dissimilarity measure for the graph cuts method. The variations of motion and depth computations that allowed handling inaccurate inputs are described in Sections 2 and 1.

A note about notation: We use the terms "depth" and "inverse depth" when we actually refer to "normalized disparity" meaning the horizontal disparity due to translation, divided by the horizontal camera translation. This normalized disparity is proportional to the inverse of the depth. The exact meaning will be clear from the context.

BRIEF DESCRIPTION OF THE DRAWINGS

In order to understand the invention and to see how it may be carried out in practice, embodiments will now be described, by way of non-limiting example only, with reference to the accompanying drawings, in which:

FIGS. 1a to 1e are pictorial representations illustrating the advantage of using flexible graph cuts;

FIGS. 4b to 4d are intermediate depth maps computed during the iterative depth and motion computations process from an original frame shown in FIG. 4a;

FIG. 10 shows how disparity variance of columns in the non-aligned x-t volume may be used to measure depth;

FIGS. 11a and 11b show respectively a segment from a first long pushbroom mosaic and a corresponding long MAD mosaic generated according to the invention;

FIGS. 11c and 11d show respectively a segment from a second long pushbroom mosaic and a corresponding long MAD mosaic generated according to an embodiment of the invention;

FIGS. 13a and 13b are schematic representations relating to the generation of new views;

FIGS. 14a and 14b are pictorial representations showing a street view (X-slits) obtained by stitching without and with depth scaling, respectively;

FIGS. 15a and 15b are pictorial representations showing respectively a panoramic image of a boat sequence and the corresponding panoramic inverse depth map;

FIG. 16 shows frames of new synthetic views generated from the same boat sequence using X-Slits;

FIGS. 17b and 17c show respectively an image frame from the same scene and its Inverse depth map;

FIGS. 17d and 17e show respectively another image frame from the same scene and its Inverse depth map;

FIGS. 18a and 18c are simulated views synthesized to appear from a distance similar to the camera location, while FIGS. 18b and 18d are synthesized from closer into the scene;

DETAILED DESCRIPTION OF EMBODIMENTS

Figure 2A:
FIGS. 2a to 2c are pictorial representations showing use of regular graph cuts approach with constant disparities to obtain an initial over-segmentation of image disparities.

1. Graph Cuts for Depth Computation (Assuming Known Motion)

Given a stereo image pair, depth can be computed by finding for each pixel in the left image its corresponding pixel in the right image. Many methods improve stereo computation by incorporating the depth consistency between neighboring points. A method that gives excellent results uses a graph cuts approach to compute depth from stereo [5]. We start by briefly describing the basic formulation of the graph cuts approach. In Sections 1.1 and 1.2 we describe our variants on this formulation: defining a flexible data penalty, and using planar surfaces instead of constant disparities.

Let L be the set of pixels in the left image. In the common graph cuts approach to stereo each pixel p in the left image is labeled with its disparity $f_p$. A desirable labeling f usually minimizes the Potts energy [8]:

$$E(f) = \sum_{p \in L} C_p(f_p) + \sum_{p,q \in N} V_{p,q} \delta(f_p \neq f_q), \quad (1)$$

where $C_p(f_p)$ is a cost for the pixel p to have the disparity $f_p$ based on image pair similarity, N denotes the set of pixel pairs in the left image which are in a neighborhood and $\delta(\bullet)$ is 1 if its argument is true and 0 otherwise. Each $V_{p,q}$ represents a penalty for assigning different disparities to neighboring pixels p and q. The value of the penalty $V_{p,q}$ is smaller for pairs $\{p,q\}$ with larger intensity differences $|I_p - I_q|$.

In stereo computations using the graph cuts approach, it is assumed that disparities can only have a finite set of values $[0, \ldots, d_{max}]$. Minimizing the energy in Eq. (1) is still NP-hard, but in [5] it was shown that using a set of "α-expansion" moves, each finding a minimal cut in a binary graph, can give good results that are very close to the global optimum.

Following [5] improvements to graph-cuts stereo were introduced (such as [12]). These include better handling of occlusions, and symmetrical formulation of stereo. While we used the basic formulation of [5], the newer approaches can be incorporated into the proposed method if needed.

It should be noted that since we pass the depth values from frame to frame, we need a consistent description that is independent of the relative motion between frames. Therefore, after computing the disparities, we normalize them by the camera translation $T_x$ between the two frames (In this section, we assume that the camera motion is given).

1.1 Flexible Pixel Dissimilarity Measure for Graph Cuts

Depth computation using iterative the graph cuts approach, as most other stereo computation methods, assumes one-dimensional displacements between input images. This is a valid assumption when accurate image rectification is possible. Rectification needs accurate camera calibration, where both internal and external camera parameters are known (or can be accurately computed). However, when the input frames are part of an uncalibrated video sequence, the computed motions usually accumulate small errors in a few frames. In addition, the internal parameters of the camera are not always known. As a result, methods that assume accurate calibration and rectification fail for such video sequences. Moreover, the presence of small sub-pixel miss-registrations between frames not only reduces the accuracy of the computed depth, but usually results in a totally erroneous depth computation.

A possible way to overcome this problem is by computing a two-dimensional optical flow rather than a one-dimensional optical flow. This approach increases the size of the graph and the computational complexity. We therefore keep the original structure of the graph using only horizontal displacements, but change the dissimilarity measure to be more tolerant for small vertical displacements.

1.1.1. Allowing 2D Sub-Pixel Displacements

The first step towards a flexible graph cuts approach is to allow horizontal and vertical sub-pixel displacements. To do so we extend an idea suggested in [3], where pixel dissimilarity takes into account image sampling. Let (x,y) be a coordinate of a pixel in the image $I_1$ and let $f_p$ be some candidate disparity. Instead of using the pixel dissimilarity $C_p(f_p) = |I_1(x,y) - I_2(x+f_p,y)|$, [3] suggests the following pixel dissimilarity:

$$C_p(f_p) = \min_{-\frac{1}{2} \leq s \leq \frac{1}{2}} |I_1(x, y) - I_2(x + f_p + s, y)|. \quad (2)$$

Eq. (2) is more accurate due to the fact that only a discrete set of disparities is possible. When the sampling of the image values at sub-pixel locations is computed using a linear interpolation, the above dissimilarity measure can be computed efficiently by:

$$C_p(f_p) = \max\{0, I_1(x,y) - v_{max}, v_{min} - I_1(x,y)\}, \quad (3)$$

where $v_{max}$ and $v_{min}$ are respectively the maximum and minimum of the two pixel values $$\left\{ I_2\left(x + f_p \pm \frac{1}{2}, y\right) \right\}.$$

To allow sub-pixel vertical displacements, we will further change the range of the target pixel $(x+f_p,y)$ from a 1D interval to a 2D region:

$$C_p(f_p) = \min_{-\frac{1}{2} \leq s, r \leq \frac{1}{2}} |I_1(x, y) - I_2(x + f_p + s, y + r)|, \quad (4)$$

which can also be efficiently computed, in a similar way to the one dimensional case (Eq. (3)).

1.1.2. Handling Larger Vertical Displacements

The next step is to handle larger vertical displacements. This is most common when having small rotation about the optical axis, in which case the pixels at the left and right boundaries have large vertical displacements. Allowing large pixel displacements without any penalty will reduce the accuracy of the 1D search that overcomes the aperture problem. Therefore, unlike the sub-pixel displacements, larger displacements have some penalty. Considering all possible vertical displacements of up to a single pixel, gives our final pixel dissimilarity measure:

$$C_p(f_p, l) = \min_{-\frac{1}{2} \leq s, r \leq \frac{1}{2}} |I_1(x, y) - I_2(x + f_p + s, y + r + l)| + |l| \cdot K, \quad (5)$$

$$C_p(f_p) = \min_{l \in \{-1, 0, 1\}} C_p(f_p, l),$$

where l is a vertical displacement and K is a penalty factor (we used K=5). Note that for a very large K, Eq. (5) reduces to the sub-pixel case in Eq. (4).

FIGS. 1a to 1e demonstrate the advantage of using the flexible graph cuts approach. FIG. 1a shows one of two inputs frames. The disparities computed by the flexible and the regular graph cuts approaches on the original frames are shown in FIGS. 1b and 1c, respectively. The disparities computed by the flexible and the regular graph cuts approaches after rotating the right frame by one degree are shown in FIGS. 1d and 1e, respectively, unknown depths being marked in black. It can be seen that the flexible and regular graph cuts approaches have similar results when using two calibrated frames, but when one of the images is slightly rotated, the flexible graph cuts approach successfully recovers the disparities for most of the pixels, while regular graph cuts approach fails.

1.2 A Planar Representation of the Scene Using Graph Cuts

In the proposed framework depth is computed by the graph cuts approach only for a partial set of frames, and is propagated to the rest of the frames by depth warping. In order to propagate depth, it should be accurate and piecewise continuous. The widely used graph cuts methods give piecewise constant depth values. As a result, they tend to over-segment the image and do not obtain sub-pixel accuracy.

Instead, we compute a piecewise planar structure, as also suggested by [9, 4]. The main differences between [4] and our method is in the initialization of the planes and in the extension of the two-frames algorithm to long un-stabilized sequences. A detailed discussion of important differences can be found in Section 7.

There are several advantages in using a planar representation of the depth rather than discrete disparity values: (1) The piecewise planar model gives a better representation of the scene especially in urban areas. (2) The planar disparity surfaces can be estimated with sub-pixel accuracy, and therefore can be used to predict the depth even at far away frames without losing its accuracy. (3) Description of the depth map with planar surfaces requires a smaller number of segments compared to constant depths. Having a smaller number of more accurate segments significantly reduces the number of pixels marked as occlusions due to quantization errors.

The depth of a planar scene surface can be denoted as a'X+b'Y+c'Z+d'=0 in the coordinate system of frame $I_1$. Assuming a perspective projection (x=fX/Z and y=fY/Z, where f is the focal length) and multiplying the surface equation by $$\frac{f}{d'Z}$$

yields:

$$\frac{a'}{d'}x_1 + \frac{b'}{d'}y_1 + \frac{fc'}{d'} + \frac{f}{Z} = 0. \quad (6)$$

Dividing by d' is valid as d'=0 only for planes that pass through the focal point, and these are planes that the camera does not see. Assuming a horizontal camera translation $T_x$ between frames $I_1$ and $I_2$, the disparity between the corresponding pixels $x_1$ and $x_2$ is $$x_1 - x_2 = f \frac{T_x}{Z}$$

so the normalized disparity $$\frac{x_1 - x_2}{T_x}$$

equals the inverse depth $$\frac{f}{Z}.$$

From Eq. 6 it can be seen that the normalized disparity (or inverse depth) of a planar surface in the scene can be expressed as an affine function in the image coordinates:

$$\frac{x_1 - x_2}{T_x} = \frac{f}{Z} = \frac{a'}{d'}x_1 - \frac{b'}{d'}y_1 - \frac{fc'}{d'}. \quad (7)$$

This formulation suggests that planar surfaces in the world induce affine disparities between the images (and vice versa). We will refer to planes in the world and "planar" disparities in the image in the same manner.

The process of computing planar disparities using graph-cuts can be described schematically as follows:
 1. Run regular graph-cuts with constant disparities in the range of $[0, \ldots, d_{max}]$.
 2. Find the parameters of a new plane and add them to the planes list.
 3. Run the graph cuts method with planar labels from the list (described in Section 1.2.2).
 4. Optionally, remove unused planes and return to Step 2.

This general scheme will now be described in a more detail.

1.2.1 Finding Candidate Planes (Steps 1-2)

Our purpose is to determine planes that will be used as labels in the planes-based graph-cuts (Step 3 and Section 1.2.2). A naive way to do so would be to select representatives of all planes, as is done in the case of constant disparities. However, this is not realistic as the space of all planar surfaces is too big, and sub-pixel accuracy is required. Therefore, the list of planes should be determined in a more efficient way.

Many times, an initial list of planes is already available. This is the case, for example, when the list of planes can be transferred from another image in the sequence where such a list has already been computed (See Section 1.3). In other cases, where no initial list of planes is available, the following scheme is applied:

Step 1: Run regular graph-cuts with constant disparities. These disparities can be viewed as disparities of planar surfaces:

$$m_i = 0 \cdot x + 0 \cdot y + i,$$

$$0 \leq i \leq d_{max}$$

Computing stereo with constant disparities can be done with the regular graph-cuts [5]. Note, however, that we always use a flexible pixel dissimilarity measure as described in Section 1.1.

Figure 2B:
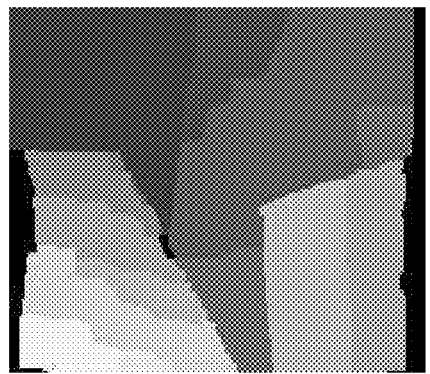

Step 2: The output of the graphcuts is used to segment the image such as shown in FIG. 2a into connected components of equal disparity. Our assumption is that each planar surface is represented by multiple segments with constant disparities as demonstrated in FIG. 2b. Based on this assumption, we calculate the affine motion parameters for each large enough segment. Let S be such a segment, then the computed affine motion parameters $m_s=(a,b,c)$ are those that minimize the error:

$$E(a, b, c) = \sum_{(x,y) \in S} [I_1(x, y) - I_2(x + ax + by + c, y)]^2 \quad (8)$$

Figure 2C:
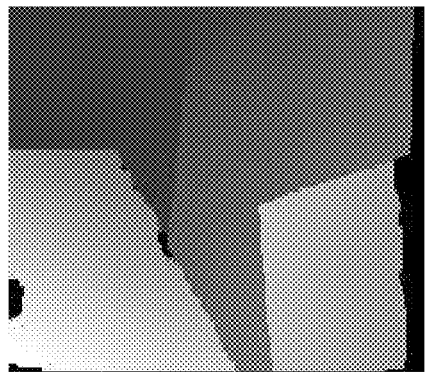

For each segment in 2b a parametric motion model is computed directly from the image intensities (using the Lucas-Kanade method) and all planes where this computation converge are used as planar labels in the planes-based graph-cuts. The result of the planes-based graph-cuts is shown in FIG. 2c. This result is distinguishable from the ground truth in only a few pixels.

The motion parameters are computed directly from the image intensities using a gradient descent algorithm in a multiresolution framework as suggested by [2]. With the method of [2], the affine parameters can be computed in a sub-pixel accuracy. If a plane consists of several disparity segments, it is sufficient that only one of the corresponding parametric motion computations will converge, while the computations that do not converge are ignored. Having multiple descriptions for the same plane is allowed. The task of segmenting the image into planar disparities according to the planes list is left to the plane based graph-cuts described next.

1.2.2 Graph Cuts with Planar Labels (Step 3)

In this section we assume that a list of candidate planes is given, and we would like to represent the disparity map between the two images with these candidate planes. An iterative graph cuts approach is performed, where each pixel p=(x,y) can be assigned with a single corresponding plane denoted as $m_p=(a,b,c)$. Similar to the classical graph cuts approach we use the Potts model as in Eq. (1), $$E(f) = \sum_{p \in L} C_p(f_p(m_p)) + \sum_{p,q \in N} V_{p,q} \delta(m_p \neq m_q) \quad (9)$$

where $f_p(m_p)$ is the disparity of the pixel p according to the planar disparity $f_p(m_p)=ax+by+c$. As a data penalty function $C_p$ we use the flexible pixel dissimilarity measure introduced in Section 1.1 (Eq. (5)). Note that the smoothness term penalizes transitions between different planes, and not transitions between different disparities. This implies that a single planar label will be the preferred representation of a single planar surface, as using multiple planes having similar parameters will be penalized. As a result, the planar representation of the scene will tend to be sparse even if the list of planes is redundant.

In addition to the labels representing planar surfaces, a special label, denoted as 'unknown' is used to represent pixels with unknown disparities. This label is assigned with a constant penalty. Although stronger formulations exist for the specific case of occlusions (such as [12]), we use this general purpose label to handle both occlusions, moving objects and deviations from the motion model.

The energy function defined above is very similar to the constant-disparities case, and can be minimized in the same manner. The result of the energy minimization will be an assignment of a planar surface to each pixel in the image. As noted before, the process of finding new candidate planes (while removing unused planes) can be repeated, this time with the better segmentation obtained by the plane-based graphcuts.

1.3 Forward Warping of Planes

A basic building block in the proposed scheme is the mapping of the inverse depths to the next frames. Let the inverse depth map for frame $I_1$ be described by planar surfaces, and let each pixel in $I_1$ be labeled as belonging to one of these planes.

The inverse depth of $I_2$ can be estimated from that of $I_1$ and from the horizontal translation $T_x$ between the two frames in the following way:

5. The parameters of each planar surface are translated from the coordinate system of the source frame $I_1$ to the coordinate system of the target frame $I_2$. This is done as follows:

Let $$D_1(x, y) = \frac{f}{Z} = ax + by + c$$

describe a planar (normalized) disparity in $I_1$. Using Eq. 7, one can go back to the coefficients of the plane in the 3D space (up to a scale factor) giving:

$$aX + bY + c\frac{Z}{f} - 1 = 0.$$

Applying a horizontal translation $T_x$ to get the representation of the plane in the coordinate system of $I_2$ yields:

$$a(X - T_x) + bY + c\frac{Z}{f} - 1 = 0, \text{ or}$$

$$aX + bY + c\frac{Z}{f} - (aT_x + 1) = 0.$$

Using Eq. 7 gives the normalized disparity in frame $I_2$:

$$D_2(x, y) = \frac{a}{a \cdot T_x + 1} x + \frac{b}{a \cdot T_x + 1} y + \frac{c}{a \cdot T_x + 1}. \quad (10)$$

The parameters of a planar disparity in $I_2$ can therefore be computed simply from the corresponding plane parameters in $I_1$ and the relative horizontal translation $T_x$.

6. The pixel labeling of $I_2$ can be computed by warping forward the pixel labeling of $I_1$. When two labels are mapped to the same pixel in $I_2$, the label corresponding to a smaller depth is used to account for occlusion. Pixels in $I_2$ that were not assigned with a label by the forward warping are marked as "unknowns", and are not used in further computations.

The forward warping of inverse depth may leave some pixels in $I_2$ with no assigned label. This is not an immediate problem to motion computation, as the depth of all pixels is not required for motion analysis. At a later stage, the labels are completed from neighboring frames or interpolated from other pixels.

The stereo computations may be accelerated significantly using a multi-resolution framework. In addition, our formulation of planar and flexible graph-cuts can be incorporated with other methods for solving Markov Random Fields. For example, a fast multi-resolution implementation of Belief-Propagation (which is an alternative way to solve MRFs) has been shown to produce good results much more efficiently. Real-time implementation of stereo matching using graphics hardware has also been used.

2. Computing Ego Motion (Assuming Known Depth)

Assume that the image $I_{k-1}$ has already been aligned and de-rotated according to the motion parameters that were computed in previous steps. Let $I_k$ be the new frame to be aligned. We are also given the inverse depth map $D_{k-1}$ corresponding to (the de-rotated) $I_{k-1}$. Our motion model includes a horizontal camera translation $T_x$ and camera rotations R about the x and z axis:

$$P + T_x = R^{-1} P', \quad (11)$$

where P and P' are corresponding 3D points in the coordinate systems of $I_{k-1}$ and $I_k$ respectively, and $T_x = [T_x, 0, 0]^t$ denotes the horizontal translation. Note that the rotation matrix R is applied only on frame $I_k$, as we assume that $I_{k-1}$ has already been aligned and de-rotated. On the other hand, the translation is applied on $I_{k-1}$, since the depths are known only for frame $I_{k-1}$.

Figure 3A:
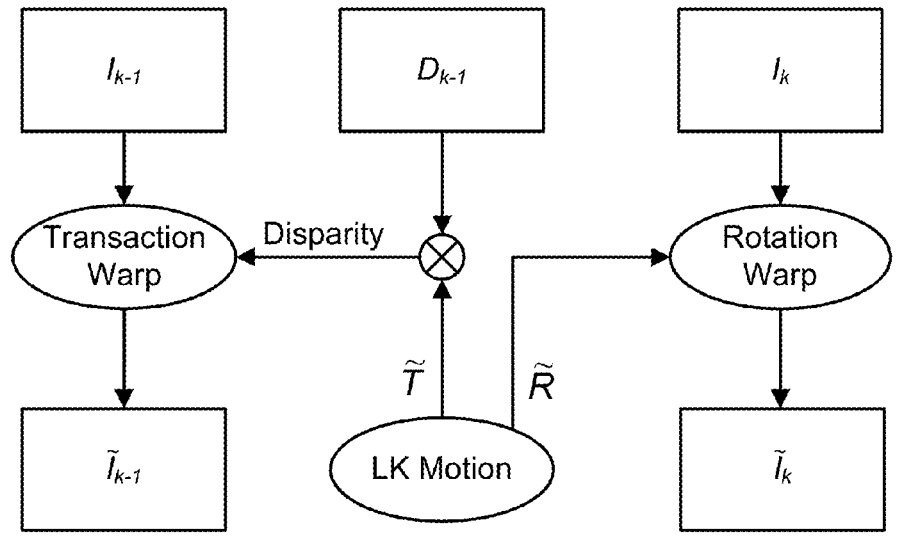
FIGS. 3a and 3b are schematic diagrams showing respectively the motion and depth computations.

FIG. 3a is a schematic diagram of the ego-motion computation, which is performed as follows:
 (1) Initial translation $\tilde{T}$ and $\tilde{R}$ are estimated (e.g. same as last frame, or zero);
 (ii) $I_{k-1}$ is warped with the estimated disparity, equivalent to $\tilde{T}$ multiplied by $D_{k-1}$, to give the warped $\tilde{I}_{k-1}$. $I_k$ is rotated by R-1 to give $\tilde{I}_k$.
 (iii) New estimations for rotation $\tilde{R}$ and translation $\tilde{T}$ are computed between the warped images $\tilde{I}_{k-1}$ and $\tilde{I}_k$.
 (iv) The process is repeated from step (ii) until convergence.

Figure 3B:
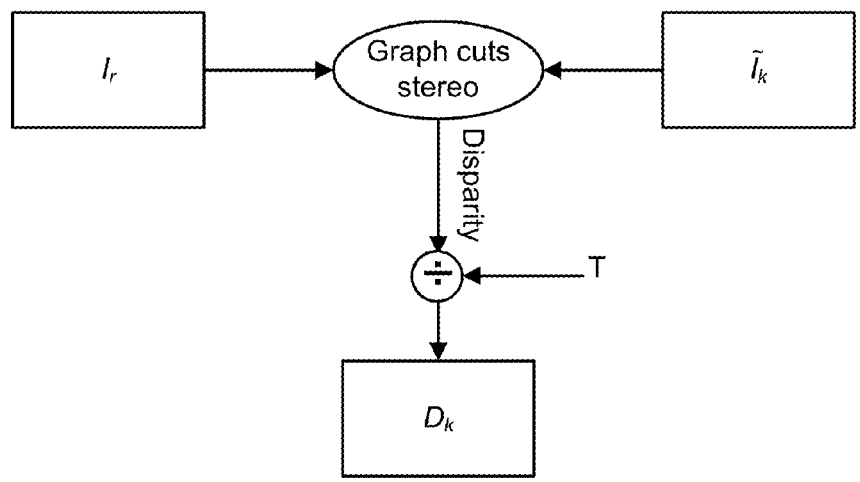

FIG. 3b shows computation of inverse depth for a new reference frame $I_k$ is performed between the previous reference frame $I_r$, and $\tilde{I}_k$. $\tilde{I}_k$ is the new frame $I_k$ after it has been rotated to the coordinate of $I_r$ by the rotation estimated in part (a). The inverse depth $D_k$ is the disparity computed between $I_r$ and $\tilde{I}_k$ divided by the translation T previously computed between these two frames.

Assuming small rotations, the image displacements can be modeled as:

$$x' = x + T_x \cdot D_{k-1}(x, y) + \cos(\alpha) x' - \sin(\alpha) y'$$

$$y' = y + b + \sin(\alpha) x' + \cos(\alpha) y' \quad (12)$$

The camera rotation about the z axis is denoted by $\alpha$, and the tilt is denoted by a uniform vertical translation b. in cases of a larger tilt, or when the focal length is small, the fully accurate rectification can be used.

To extract the motion parameters, we use a slight modification of the Lucas-Kanade direct 2D alignment [2], iteratively finding motion parameters which minimize the sum of square differences using a first order Taylor approximation. The approximations $\cos(\alpha) \approx 1$ and $\sin(\alpha) \approx \alpha$ are also used, giving the following error function to be minimized:

$$E(T_x, b, \alpha) = \quad (13)$$

-continued $$\sum_{x,y} \{I_{k-1}(x - T_x \cdot D_{k-1}(x, y), y) - I_k(x' - \alpha y', y' + b + \alpha x')\}^2.$$

We use the first order Taylor expansion around $I_{k-1}(x,y)$ and around $I_k(x',y')$ to approximate:

$$I_{k-1}(x - T_x \cdot D_{k-1}(x, y), y) \approx I_{k-1}(x, y) - \frac{\partial I_{k-1}}{\partial x} T_x D_{k-1}(x, y) \quad (14)$$

$$I_k(x' - \alpha y', y' + b + \alpha x') \approx I_k(x', y') + \frac{\partial I_k}{\partial x'}(-\alpha y') + \frac{\partial I_k}{\partial y'}(b + \alpha x'),$$

which results in the following minimization:

$$E(T_x, b, \alpha) = \sum_{x,y} \left\{ I_{k-1}(x, y) - I_k(x', y') - \frac{\partial I_{k-1}}{\partial x} T_x D_{k-1}(x, y) - \frac{\partial I_k}{\partial x'}(-\alpha y') - \frac{\partial I_k}{\partial y'}(b + \alpha x') \right\}^2 \quad (15)$$

The minimization can be solved efficiently by taking the derivatives of the error function E with respect to each of the three motion parameters and setting them to zero, giving the following linear set of equations with only three unknowns:

$$A^T A \begin{bmatrix} T_x \\ \alpha \\ b \end{bmatrix} = c A^T, \quad (16)$$

where $$A = \left[ \sum_{x,y} \frac{\partial I_{k-1}}{\partial x} D_{k-1}(x, y), \sum_{x,y} \left( \frac{\partial I_k}{\partial y'} x' - \frac{\partial I_k}{\partial x'} y' \right), \sum_{x,y} \frac{\partial I_k}{\partial y'} \right],$$

and $$c = \sum_{x,y} (I_{k-1}(x, y) - I_k(x', y')).$$

Similar to [2], we handle large motions by using an iterative process and a multi-resolution framework. In our case, however, we simultaneously warp both images, one towards the other: we warp $I_{k-1}$ towards $I_k$ according to the computed camera translation $T_x$ (and the given inverse depth), and we warp $I_k$ towards $I_{k-1}$ according to the computed rotation $\alpha$ and the uniform vertical translation b.

For additional robustness, we added outlier removal and temporal integration:
 Pixels where the intensity difference is large are marked as outliers and are omitted from the motion computation. Specifically, we omit pixels with $$\frac{\left| \sum_W (I_{k-1}(x, y) - I_k(x', y')) \cdot \frac{\partial I_{k-1}}{\partial x} \right|}{\sum_W \frac{\partial I_{k-1}^2}{\partial x}} > s, \quad (17)$$

where W is a 5×5 neighborhood, and s is a threshold (we used s=1). Other schemes such as re-weighted least squares can also be used. Obviously, pixels that were marked by the depth computation as having an unknown disparity are also not used.

Frames that were already aligned are averaged with earlier frames, also known as "Temporal Integration". Instead of computing motion using a single reference frame, we use the temporal integration that was shown in [11] to add stability and robustness to outliers in traditional 2D alignment methods.

Since the computed depth is quantized, a consistent depth pattern (e.g. the common case when near objects are on the bottom of the image and far objects are on the top of the image) can cause a small rotational bias, which accumulates in long sequences. A small modification of the motion computation method described earlier can overcome this problem: Since the depth parallax is horizontal, only vertical displacements are used to compute image rotation. To do so, we change the error function in Eq. (13) to:

$$E(T_x, b, \alpha) = \sum_{x,y} \{I_{k-1}(x - T_x \cdot D_{k-1}(x, y), y) - I_k(x', y' + b + \alpha x')\}^2. \quad (18)$$

As in the original method, the iterative image warping is done using the accurate rotation matrix. It should be noted that more general motion models can be computed, however our experience showed that adding motion parameters that are not independent (e.g. pan with horizontal translation) may reduce the robustness of the motion computation for scenes with small depth variations. Our current approach can even handle scenes that are entirely flat.

3. Interleaving Computation of Depth and Motion

In the proposed method, the motion of the camera and the depth of the scene are computed for all frames. While the camera motion varies from frame to frame, the depth is consistent across frames. On the other hand, the camera motion consists of only a few parameters per frame, while the depth should be computed for each pixel. It is well known that the observed image motion can be factorized to its shape and motion components [8]. However, in long video sequences scene features are visible only in a few frames, and computed structure and motion information should be passed along the sequence.

The process is initialized by computing the inverse depth for the first frame. It is continued by interleaving stereo and motion computations, until the motion of the camera and the corresponding inverse depths are computed for the entire sequence. The initialization is described in Section 3.1 (and FIG. 5), and the interleaving process is described in Section 3.2. A schematic work-flow of the interleaving process is shown in FIG. 6.

3.1 Initialization: First Two Frames

Figure 5:
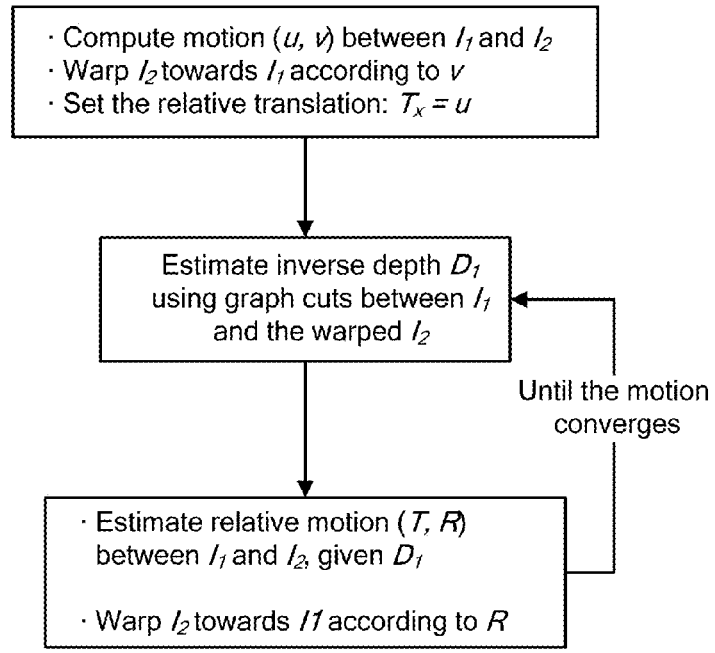
FIG. 5 is a schematic diagram showing work-flow of the initialization stage.
Figure 6:
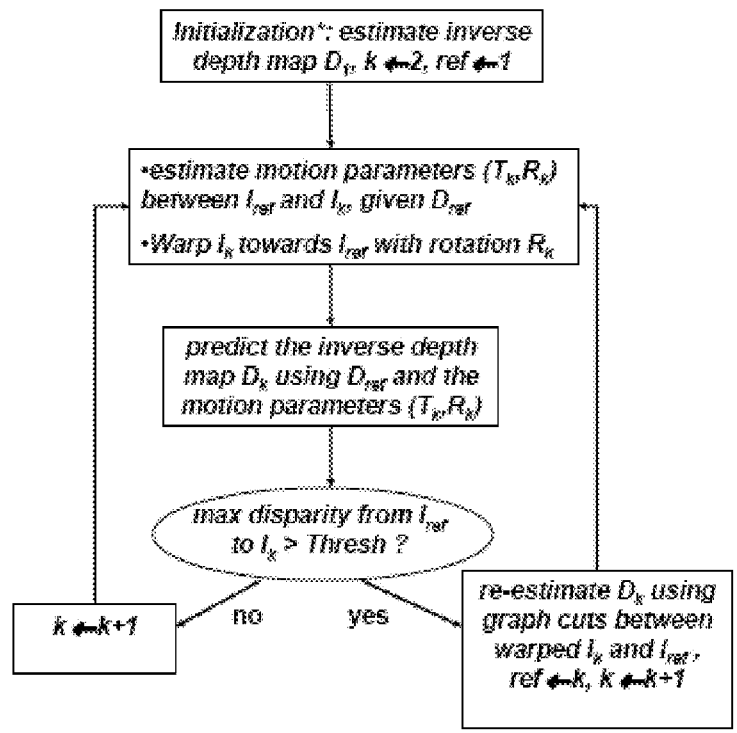
FIG. 6 is a schematic diagram showing work-flow of the interleaving process.

FIG. 5 is a schematic diagram showing work-flow of the initialization stage, which will now be described. A 2D image translation (u,v) is initially computed using the traditional Lucas-Kanade method [5], between $I_1$ (the reference frame) and $I_k$, for k=2, 3, . . . . This is performed until a frame $I_k$ having sufficient horizontal displacement from $I_1$ is reached. Given (u,v), $I_k$ is warped vertically towards $I_1$ according to v, and it is assumed that $T_x$=u. The vertical motion v is estimated accurately since the parallax is mostly horizontal.

The graph cuts algorithm is applied on $I_1$ and the warped $I_k$ to estimate the depth map of $I_1$ as described in Section 1. Despite the rotational component which has not yet been compensated, a correct depth map for most of the pixels can be estimated by using the "Flexible Dissimilarity Measure" (Section 1.1). The "unknown" label is automatically assigned to pixels with large vertical displacements induced by the rotation. The pixels that get valid depth values can now be used to compute a better estimation of the relative camera motion between $I_1$ and $I_k$ (using the ego motion computation described in Section 2).

After warping $I_k$ towards $I_1$ according to the estimated rotation matrix, the depth map of $I_1$ is re-computed. We continue with this iterative process until convergence.

Figure 4A:
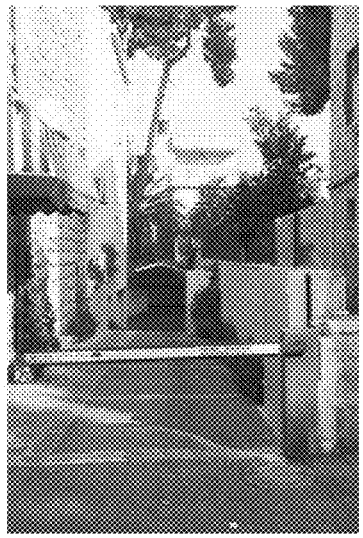
Figure 4B:
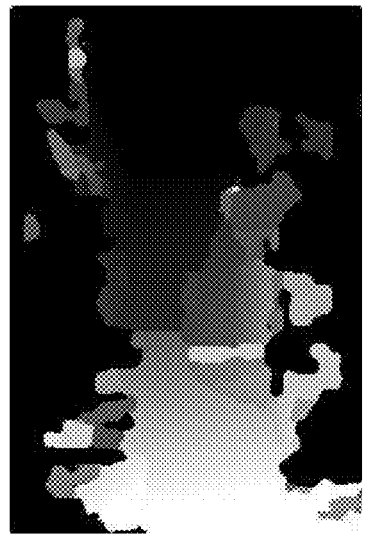
Figure 4C:
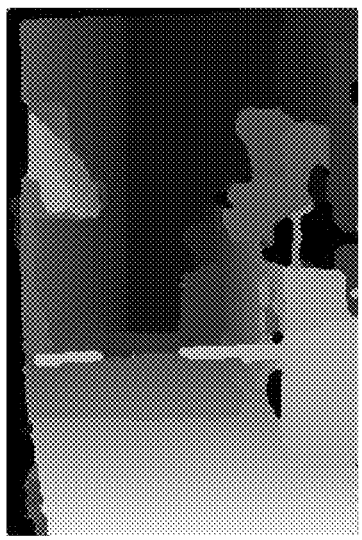
Figure 4D:
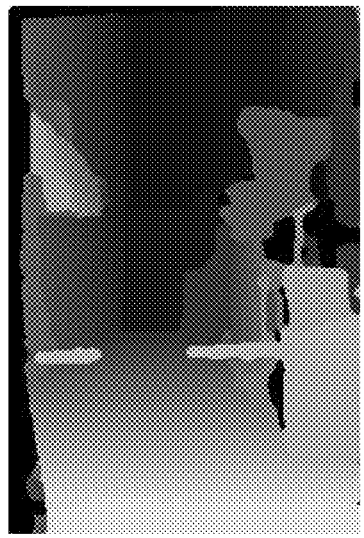

FIGS. 4b to 4d are intermediate depth maps computed during the iterative depth and motion computations process from an original frame shown in FIG. 4a (unknowns are marked in black). In this example, two frames from a video sequence were selected, and one of the frames was manually rotated by 2°. The intermediate depth maps that were obtained during the iterative process are shown, demonstrating the effective convergence of the proposed method. It can be seen that the columns at the left and right margins are marked as unknowns in the first iteration due to their large vertical displacements. The support of the center pixels was sufficient to correctly extract the relative motion between the two frames.

3.2 Interleaving Computation for the Entire Sequence

FIG. 6 is a schematic diagram showing work-flow of the interleaving process, which will now be described. During the initialization process the inverse depth map $D_1$ was computed, corresponding to frame $I_1$. The reference frame $I_r$ is set to be $I_1$, and its inverse depth map $D_r$ is set to be $D_1$.

With the inverse depth $D_r$, the relative camera motion between the reference frame $I_r$ and its neighboring frame $I_k$ can be computed as described in Section 2. Let $(T_k, R_k)$ be the computed camera pose for frame $I_k$ compared to the reference frame $I_r$. Given $(T_k, R_k)$ and the inverse depth map $D_r$ for image $I_r$, the inverse depth values of $D_r$ can be mapped to the coordinate system of $I_k$ as described in Section 1.3, giving $D_k$. A schematic diagram of the work-flow is shown in FIG. 3.

Camera motion is computed as described above between $I_r$ and its neighboring frames $I_{r+1}, I_{r+2}$, etc., until the maximal disparity between the reference frame $I_r$ and the last frame being processed, $I_k$, reaches a certain threshold. At this point the inverse depth map $D_k$ has been computed by forward warping of the inverse depth map $D_r$. $D_k$ is updated using the iterative graph cuts approach between $I_k$ and $I_r$ to get better accuracy. To encourage consistency between frames, small penalties are added to all pixels that are not assigned with labels of their predicted planes. This last step can be done by slightly changing the data term in Eq. (1).

Recall that for keeping the consistency between the different frames, the disparities computed by the graph cuts method should be normalized by the horizontal translation computed between the frames, giving absolute depth values (up to a global scale factor).

After $D_k$ was updated, the new reference frame $I_r$ is set to be $I_k$, and its inverse depth map $D_r$ is set to be $D_k$. The relative pose and the inverse depth of the frames following $I_r$ are computed in the same manner, replacing the reference frame whenever the maximal disparity exceeds a given threshold.

The process continues until the last frame of the sequence is reached. In a similar manner, the initial frame can be set to be one of the middle frames, in which the interleaving process continues in the both positive and negative time directions.

This scheme requires a computation of the inverse depths using the graph cuts method only for a subset of the frames in the sequence. Besides the benefit of reducing the processing time, disparities are more accurate between frames having larger separation. While depth is computed only on a subset of frames, all the original frames are used for stitching seamless panoramic images.

3.3 Panoramic Rectification

In real scenarios, the motion of the camera may not perfectly satisfy our assumptions. Some small calibration problems, such as lens distortion, can be treated as small deviations from the motion model and can be overcome using the robust tools (such as the "unknown" label or the "flexible" graph cuts approach presented in Section 1.1).

However, a bigger challenge is introduced by the camera's initial orientation: if the camera is not horizontally leveled in the first frame, the motion computations may consist of a false global camera rotation. The deviation of the computed motion from the actual motion may hardly be noticed for a small number of frames (making traditional calibration much harder). But since the effect of a global camera rotation is consistent for the entire sequence, the error accumulates, causing visual artifacts in the resulting panoramas.

This problem can be avoided using a better setup or by pre-calibrating the camera. But very accurate calibration is not simple, and in any case our work uses videos taken by uncalibrated cameras, as shown in all the examples.

A possible rotation of the first image can be addressed based on the analysis of the accumulated motion. A small initial rotation is equivalent to a small vertical translation component. The effect for a long sequence will be a large vertical displacement. The rectification of the images will be based on this effect: After computing image translations ($u_i$, $v_i$) between all the consecutive frames in the sequence, the camera rotation $\alpha$ of the first frame can be estimated as $\alpha = \arctan(\Sigma_i v_i / \Sigma_i u_i)$. A median can be used instead of summation in the computation of $\alpha$ if a better robustness is needed. All the frames are derotated around the z axis according to $\alpha$.

4. Minimal Aspect Distortion (MAD) Panorama

The mosaicing process can start once the camera ego-motion and the dense depth of the scene have been computed. Motion and depth computation can be done as proposed in the previous sections, or can be given by other processes. We propose two approaches for mosaicing. In Section 5 the X-Slits approach is used for rendering selected viewpoints. In this section a new method is presented for generation of a long minimal aspect distortion (MAD) panorama of the scene. This panorama should satisfy the following properties: (i) The aspect distortions should be minimal (ii) The resulting mosaic should be seamless.

Since the mosaicing stage comes after motion computation, the images in this section are assumed to be de-rotated and vertically aligned, and therefore the remaining displacement between the images is purely horizontal. It is also assumed that the depth maps are dense. The depth values for pixels that were labeled as unknowns are interpolated from other frames (see Section 1.3). When pixels are occluded in all neighboring frames, they are interpolated from neighboring pixels.

4.1 Panorama as a Cut in the Space-Time Volume

Figure 7:
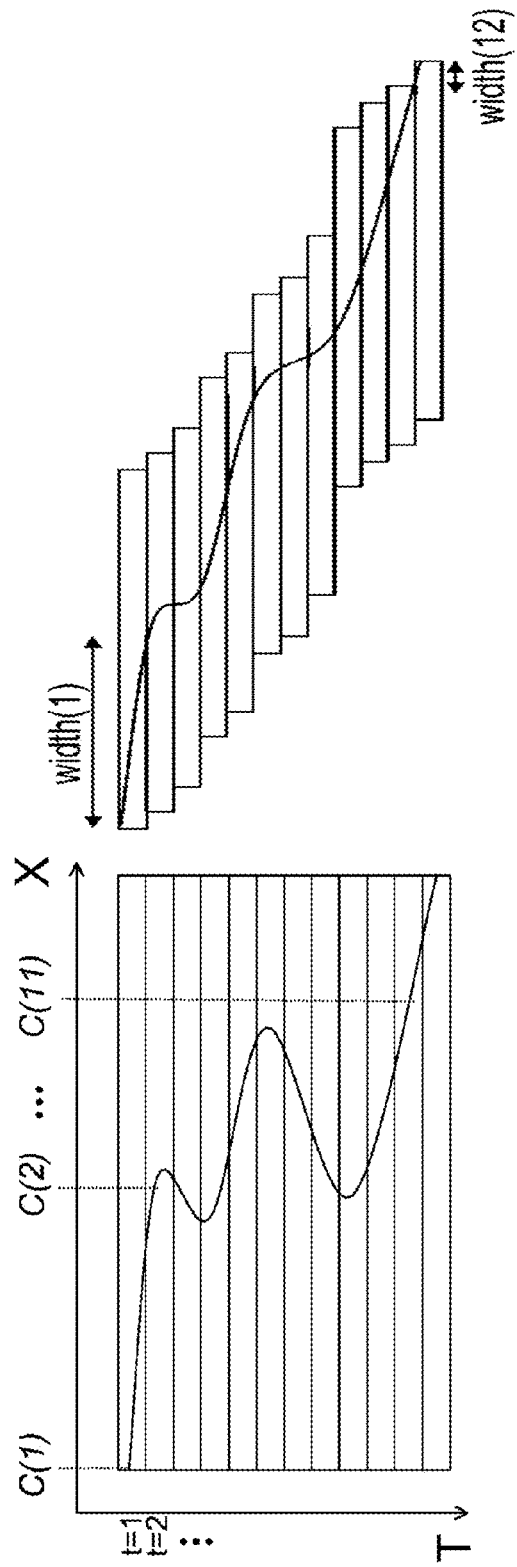
FIG. 7a shows pictorially a general cut C(t) through the space-time volume.
FIG. 7b shows pictorially the same cut depicted in FIG. 7a in the spatially aligned space-time volume.

FIG. 7a shows pictorially a general cut C(t) through the space-time volume, while FIG. 7b shows the same cut in the spatially aligned space-time volume. C(t) designates the leftmost column of the strip $S_t$ taken from frame t. A panoramic image is determined by a cut C(t) through the space-time volume, as seen in FIG. 7b. For each image t, C(t) determines the left column of a strip $S_t$ in image t to be stitched into the panorama.

Figure 8:
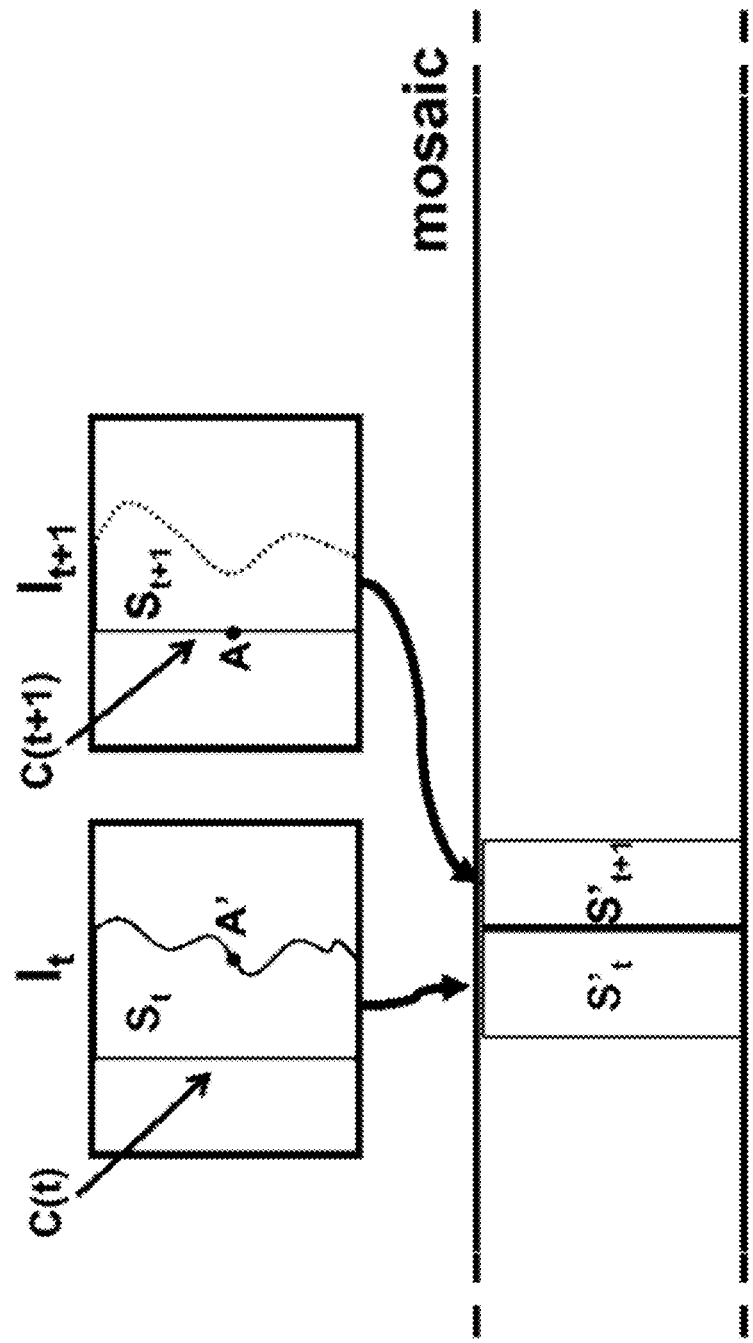
FIG. 8 depicts how the panorama is stitched from a collection of rectangular strips.

As shown in FIG. 8 to obtain a seamless stitching, the right border of the strip $S_t$ is a curved line, corresponding to the left side of the next strip, i.e. C(t+1). This curved line is computed using the camera motion and the known inverse depth. The image strip $S_t$ is warped to a rectangular strip S', before being pasted into the panorama. The panorama is stitched from a collection of rectangular strips S'$_t$ warped from the input frames $S_t$. The stitching is seamless because each point A' on the right border of the image strip $S_t$ corresponds to the point A on the left border $S_{t+1}$, according to its the computed disparity. A and A' are the same point in the mosaic's coordinates. The warping is done by scaling each row independently, from its width in $S_t$ to the width of S'$_t$ given by:

$$\text{width}(S'_t) = C(t+1) - C(t) + \text{alignment}_{t+1}(C(t+1)), \quad (19)$$

where alignment$_{t+1}$(x) is set to be the average disparity of the pixels in column x of image t+1 relative to image t. This average disparity equals to the average inverse depth at this column multiplied by the relative horizontal translation $T_x$. In the warping from $S_t$ to S'$_t$ far away objects are widened and closer objects are becoming narrower.

Figure 9B:
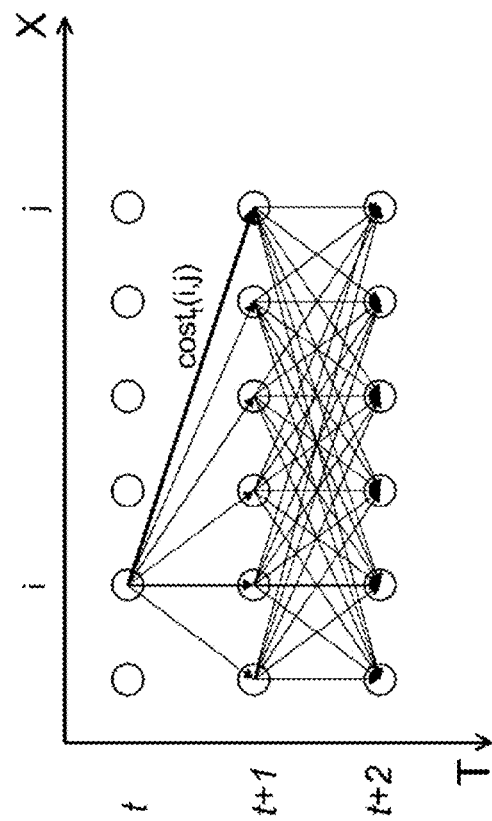
FIGS. 9a and 9b are diagrams showing respectively selection of nodes and graph construction using X-Slits projection.
Figure 9A:
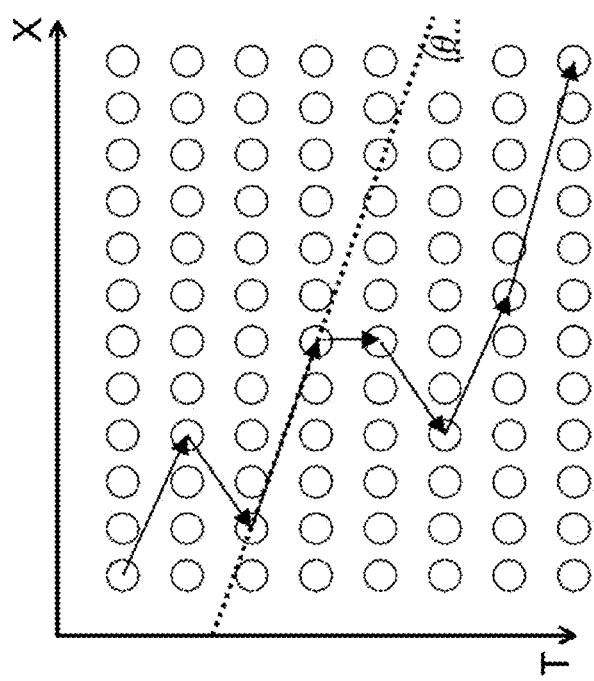

FIGS. 9a and 9b are diagrams showing respectively selection of nodes and graph construction using X-Slits projection. FIG. 9a shows a path C in the graph. C(t) indicates the node selected in time t. Locally C(t) is a X-Slits projection as shown by the dotted line, with slope=cot(θ). FIG. 9b shows graph construction where the nodes are all the columns in the X-T space. There are edges from each column of image t to all the columns of image t+1.

In pushbroom and X-Slits projections (See FIG. 13), C(t) is a linear function of the camera translation. The local derivative of a general cut C(t) can represent a local X-Slits slice having a slope of:

$$\text{slope}(t) = dC(t)/dt, \quad (20)$$

as demonstrated in FIG. 9a. The local X-Slits slope can change spatially throughout the panorama. Special slopes are the pushbroom projection (slope(t)=0) and the perspective projection (slope(t)→∞).

In [18] a minimum distortion mosaic is created such that the slope function is piecewise constant, and a non-linear optimization is used to minimize this distortion. In MAD mosaicing the cut C(t) is allowed to be a general function, and simple dynamic programming is used to find the global optimum.

4.2 Defining the Cost of a Cut

The optimal cut through the space-time volume that creates the MAD mosaic is the cut that minimizes a combination of both a distortion cost and a stitching cost. The cost of a cut C(t) is defined as follows:

$$cost(C) = \sum_t distortion_t(C_t, C_{t+1}) + \alpha \sum_t stitching_t(C_t, C_{t+1}), \quad (21)$$

where t is a frame number and $\alpha$ is a weight. The distortion term estimates the aspect distortion in each strip, and the stitching term measures the stitching quality at the boundaries. Both are described next.

Distortion cost: As described before, a cut C determines a set of strips $\{S_t\}$. We define the distortion cost distortion$_t$(C(t),C(t+1)) to be the variance of disparities of the pixels in strip $S_t$. This is a good measurement for distortion, as strips with high variance of disparities have many dominant depths. Objects in different depths have different motion parallax, resulting in a distorted mosaic. In this case, we prefer such strips to be wider, giving a projection that is closer to perspective. A single wide strip in a high variance region will be given a lower cost than multiple narrow strips.

Figure 12A:
FIGS. 12a, 12b and 12c show, respectively, a MAD mosaic of a street in Jerusalem; a graph showing C(t), the left strip boundary for each frame; and the depth map of the mosaic constructed according to an embodiment of the invention.
Figure 12B:
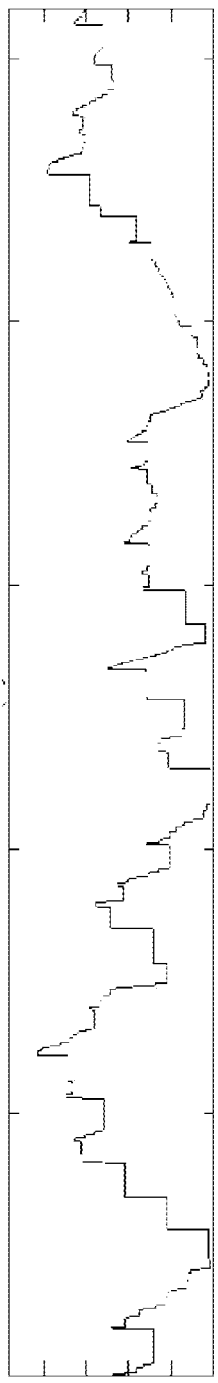
Figure 12C:
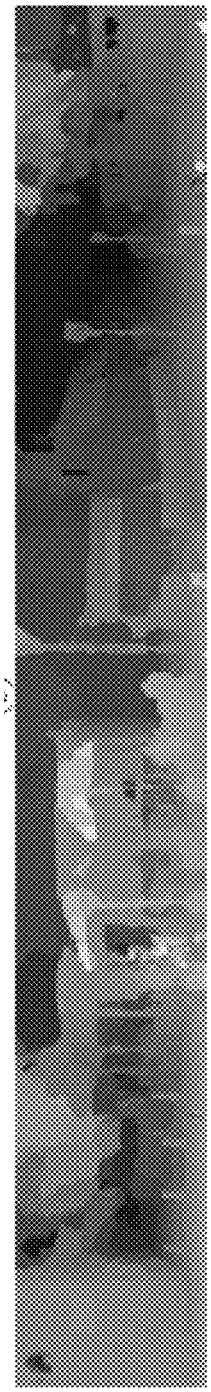

FIG. 10 shows disparity variance at columns in the non-aligned x-t volume corresponding to FIGS. 12a, 12b and 12c showing, respectively, a MAD mosaic of a street in Jerusalem; a graph showing C(t), the left strip boundary for each frame; and the depth map of the mosaic constructed according to an embodiment of the invention. Each row in FIG. 10 represents an input image, and the value at location (x, t) represents the variance of normalized disparity at column x of image t. The distortion cost is the variance of each strip, and here we show the variance of each column. It can be observed that the selected cut has a large slope when it passes through problematic areas that have high variance. A large slope is equivalent to wide strips; giving a result that is close to the original perspective.

We have also experimented with a few different distortion functions: spatial deviation of pixels relative to the original perspective; aspect-ratio distortions of objects in the strip ([18]), etc. While the results in all cases were very similar, depth variance in a strip (as used in our examples) was preferred as it consistently gave the best results, and due to its simplicity.

Stitching cost: The stitching cost measures the smoothness of the transition between consecutive strips in the panoramic image, and encourages seamless mosaics. We selected a widely used stitching cost, but unlike the common case, we also take the scene depth into consideration when computing the stitching cost. This stitching cost is defined as the sum of square differences between the C(t+1) column of image t+1 and the corresponding column predicted from image t. To compute this predicted column an extra column is added to $S'_t$, by generating a new strip of width width($S'_t$)+1 using the method above. The right column of the new strip will be the predicted column.

In addition to the distortion and stitching costs, strips having regions that go spatially backwards are prohibited. This is done by assigning an infinite cost to strips for which C(t+1) <C(t)+$D_{min}$(C(t+1)), where $D_{min}$(C(t+1)) is the minimal disparity in the column C(t+1) of image t+1. For efficiency reasons, we also limit C(t+1)−C(t) to be smaller than ⅕ of the image's width.

The distortion cost and the minimal and average disparities are computed only from image regions having large gradients. Image regions with small gradients (e.g. a blue sky) should not influence this cost as distortions are imperceptible at that regions, and their depth values are not reliable.

4.2.1 Graph Construction and Minimal Cut

The graph used for computing the optimal cut is constructed from nodes representing image columns. We set a directed edge from each column $x_1$ in frame t to each column $x_2$ in frame t+1 having the weight $$V_t(x_1,x_2)=\text{distortion},(x_1,x_2)+\alpha\cdot\text{stitching}_t(x_1,x_2).$$

Each cut C corresponds to a path in the graph, passing through the column C(t) at frame t. The sum of weights along this path is given by $\Sigma_t V_t(C(t),C(t+1))$, and is equal to the cost defined in Eq. 21.

Finding the optimal cut that minimizes the cost in Eq. 21 is therefore equivalent to finding the shortest-path from the first frame to the last frame in the constructed graph. Any shortest-path algorithm can be used for that purpose. We implemented the simple Bellman-Ford dynamic programming algorithm with online graph construction.

FIGS. 11a and 11b show respectively a segment from a first long pushbroom mosaic and a corresponding long MAD mosaic generated according to the invention. FIGS. 11c and 11d are similar pictures relating to different regions of the scene. The visible differences between the Pushbroom mosaics and the MAD mosaics are large because the camera is very close to the scene, and depth differences inside the scene are large compared to the distance between the camera and the scene.

5. Dynamic Image Based Rendering with X-Slits

MAD mosaicing generates a single panoramic image with minimal distortions. A MAD panorama has multiple viewpoints, and it can not be used to create a set of views having a 3D effect. Such 3D effects can be generated by X-Slits mosaicing.

New perspective views can be rendered using image based rendering (IBR) methods when the multiple input images are located densely on a plane [13,6]. In our case the camera motion is only 1D and there is only horizontal parallax, so perspective images cannot be reconstructed by IBR. An alternative representation that can simulate new 3D views in the case of a 1D camera translation is the X-Slits representation [23]. With this representation, the slicing function C(t) is a linear function of the horizontal translation.

FIG. 13a shows that changing the slope of the slice simulates a forward-backward camera motion, while shifting the slice simulates a sideways camera motion. Constant slicing functions (C(t)=const) generating parallel slices in the space-time volume, as in FIG. 13b, correspond to pushbroom views from infinity. More general linear functions, $$C(t)=a\cdot U_x+b$$

where $U_x$ is the accumulated horizontal camera translation, correspond to finite viewing positions.

As the linear slicing functions of the X-Slits are more constrained than those used in MAD mosaicing, they cannot avoid distortions as in MAD mosaicing. On the other hand, X-Slits projections are more powerful to create a desired viewpoint. For example, in MAD-mosaicing distortions are reduced by scaling each strip according to the average disparity, while in the X-slits representation image strips are not scaled according to disparity. This is critical for preserving the geometrical interpretation of X-Slits, and for the consistency between different views, but it comes at the expense of increasing the aspect distortions.

5.1 Seamless Stitching for X-Slits

Since a video sequence is not dense in time, interpolation should be used to obtain continuous mosaic images. When the displacement of the camera between adjacent frames is small, reasonable results can be obtained using some blurring of the space-time volume [13,6]. For larger displacements between frames, a depth-dependent interpolation must be used. The effect of using depth information for stitching is shown in FIG. 14. FIG. 14a shows results without using the dense depth. While the restaurant (whose depth is close to the dominant depth in the scene) is stitched well, closer objects (rails) are truncated and faraway objects are duplicated. In contrast, stitching according to the dense depth map (FIG. 14b) gives a far better stitching result. Note that very narrow objects are still a challenge to our method and may not be stitched well (such as the narrow pole on the right side of the restaurant). This problem is usually avoided in the MAD mosaicing, which tends to keep such narrow objects in a single strip.

We used two different rendering approaches of X-Slit images: an accurate stitching using the dense depth maps, and a faster implementation suitable for interactive viewing. The accurate stitching is similar to the one described in section 4.1, with the only difference that the image strips are not scaled according to average disparity. To get real-time performance suitable for interactive viewing we cannot scale independently each row. Instead, the following steps can be used in real-time X-Slits rendering: (i) Use a pre-process to create a denser sequence by interpolating new frames between the original frames of the input sequence. This can be done using the camera motion between the frames, and their corresponding inverse depth maps. (ii) Given the denser sequence, continuous views can be obtained by scaling uniformly each vertical strip pasted into the synthesized view, without scaling each row separately. The uniform scaling of each strip is inversely proportional to the average disparity in the strip.

6. Experimental Results

All experiments discussed in this patent were performed on videos without camera calibration, and without manual involvement (except for the setting of the maximal allowed disparity, which was done only to speed up performance).

Figure 17A:
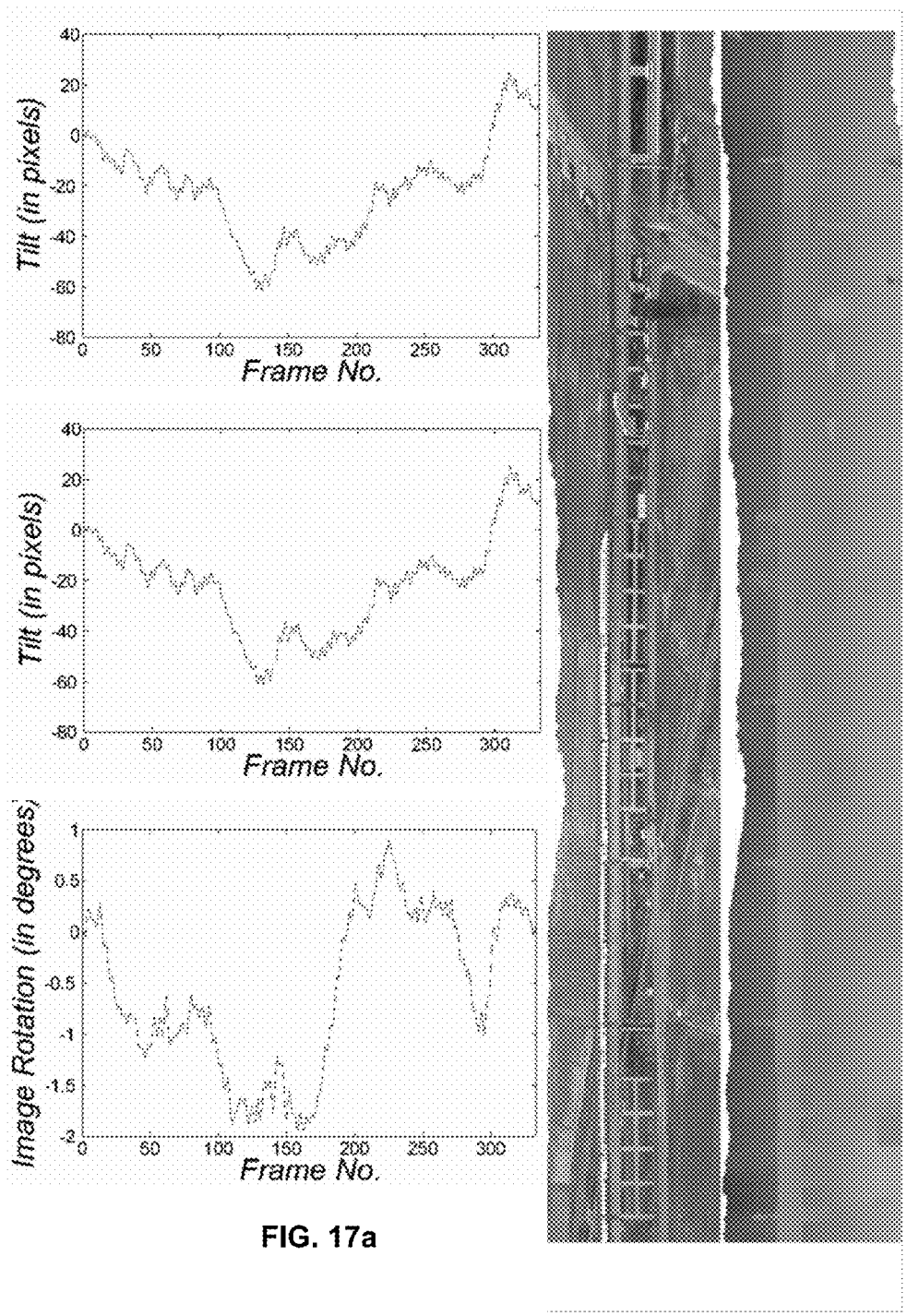
FIG. 17a show a panoramic view of a scene, with its corresponding inverse depth and motion parameters (Tx and accumulated tilt and image rotations)
Figure 19:
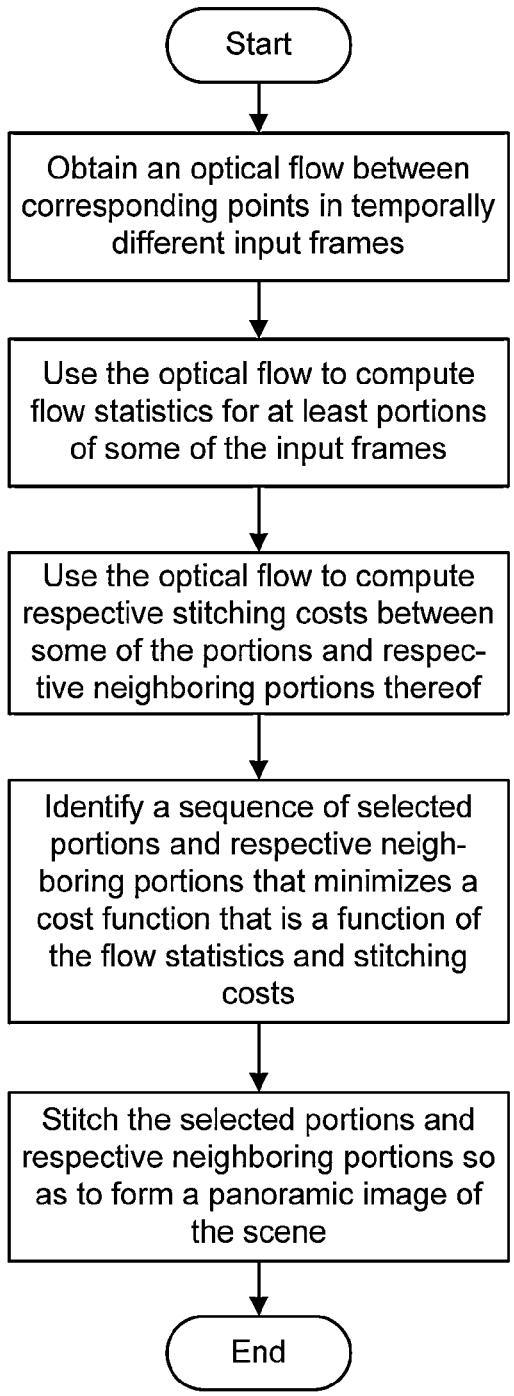
FIG. 19 is a flow diagram showing the principal operations carried out by a method according to the invention.

The examples demonstrate the applicability of our method to a variety of scenarios, including a sequence captured from a river boat (FIG. 15-16), a helicopter (FIG. 17) and a driving car in a long street (FIG. 18-19). We constructed panoramic images using X-Slits (FIG. 15,17) as well as sample images from a virtual walk-through (FIGS. 16 and 18). In FIG. 18 MAD mosaicing was used to reduce distortions.

To successfully process all these different scenarios, the method had to handle different types of camera motions (e.g. highly unstable camera in the helicopter sequence), and different kinds of scenes (such as the street sequence, where the depths varies drastically between the front of the buildings and the gaps between them).

MAD mosaicing was proven to work particularly well on long and sparse sequences, as shown in FIG. 19. Some objects have such a large disparity that the stereo computation could not register them well, e.g. the close traffic signs that have a disparity greater than 50 pixels. In such cases the stitching cost is responsible for rendering these objects using a wide strip from a single frame. As shown in FIG. 12, moving people and some of the very close traffic signs were rendered correctly in most cases.

More details about each sequence are now described:

Boat: The input sequence used to produce the panoramic boat image in FIG. 15 consists of 450 frames. The camera is relatively far from the scene, and therefore the variance of the depth was small relative to other sequences (such as the street sequence). This allowed us to limit the maximal disparity to 20 pixels, and reduce the run-time which is approximately linear in the number of labels. In addition, the iterative graph-cuts was applied on this sequence only once in 5 frames on average (The graph cuts method is performed only when the maximal disparity reaches a certain threshold, as described in Section 4).

Shinkansen: The input sequence used to produce the panoramic image in FIG. 17 consists of 333 frames. The derailed Shinkansen train is not moving. Some intermediate depth maps and the motion parameters are also shown. A panoramic image of the same scene consisting of 830 frames appears in the homepage.

FIG. 19 is a flow diagram showing the principal operations carried out by a method according to the invention for forming a panoramic image of a scene having at least two points at different distances from the optical center of a camera that translates relative to the scene. According to the method, an optical flow is obtained between corresponding points in temporally different input frames of a sequence of input frames captured by the camera. The optical flow is used to compute flow statistics for at least portions of some of the input frames as well as to compute respective stitching costs between some of the portions and respective neighboring portions thereof. A sequence of selected portions and respective neighboring portions is identified that minimizes a cost function that is a function of the flow statistics and stitching costs, and the selected portions and respective neighboring portions are stitched so as to form a panoramic image of the scene, which may then be displayed or stored for further processing.

Figure 20:
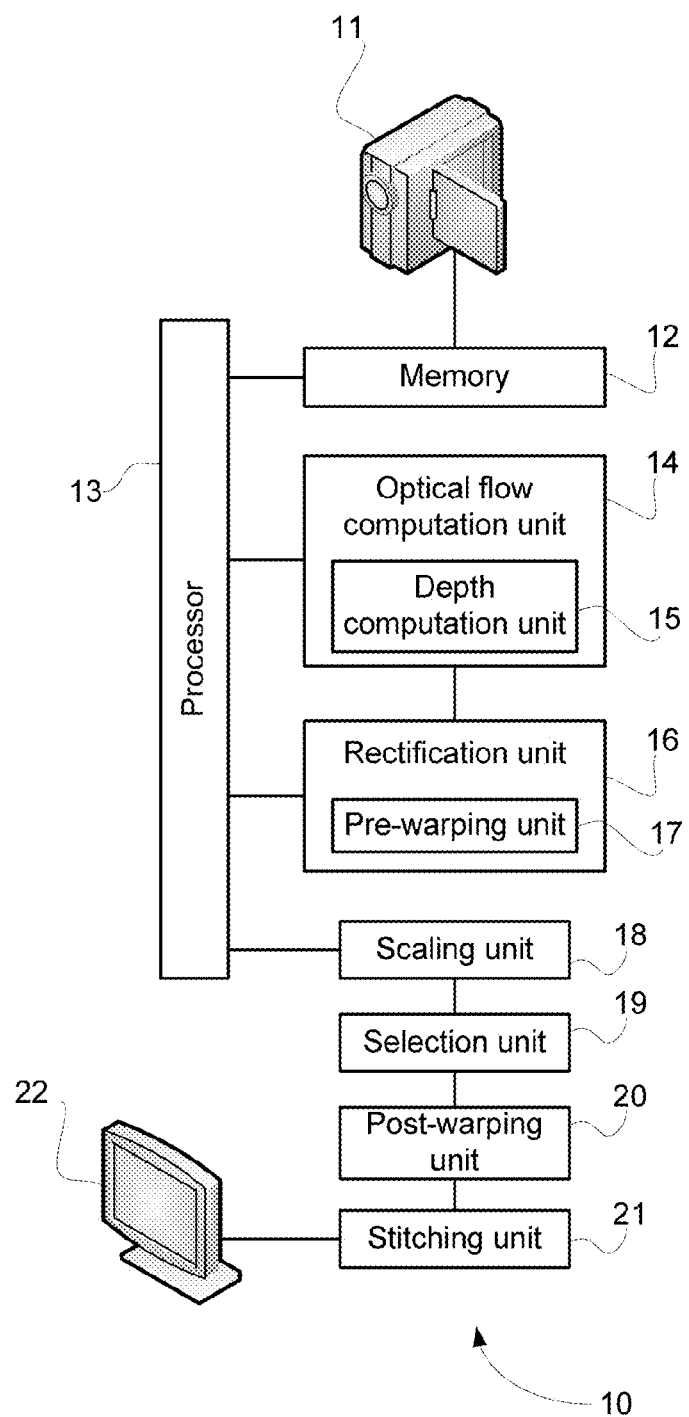
FIG. 20 is a block diagram showing functionality of a system according to the invention.

FIG. 20 is a block diagram showing functionality of a system 10 according to an embodiment the invention, comprising a video camera 11 that captures video sequences whose input frames are stored in a memory 12. A processor 13 is coupled to the memory 12 and is responsive to an optical flow between corresponding points in temporally different input frames for computing flow statistics for at least portions of some of the input frames and for computing respective stitching costs between some of the portions and respective neighboring portions thereof. Optical flow is computed by an optical flow computation unit 14 from data indicative of motion of the camera and respective depth data of pixels in the input frames determined by a depth computation unit 15.

Optionally, a rectification unit 16 is coupled to the processor 13 for rectifying the optical flow. This may be done, for example, by means of a pre-warping unit 17 that warps at least some of the input frames. Likewise, there may optionally be provided a scaling unit 18 coupled to the processor 13 for scaling at least some of the input frames according to the optical flow or depth data.

A selection unit 19 is coupled to the processor 13 for selecting a sequence of portions and respective neighboring portions that minimizes a cost function that is a function of the flow statistics and stitching costs. A post-warping unit 20 may optionally be coupled to the selection unit 19 for warping at least one of the selected portions. A stitching unit 21 is coupled to the selection unit 19 for stitching the selected portions and respective neighboring portions (after optional warping) so as to form a panoramic image of the scene, which may then be displayed by a display unit 22.

Figure 21:
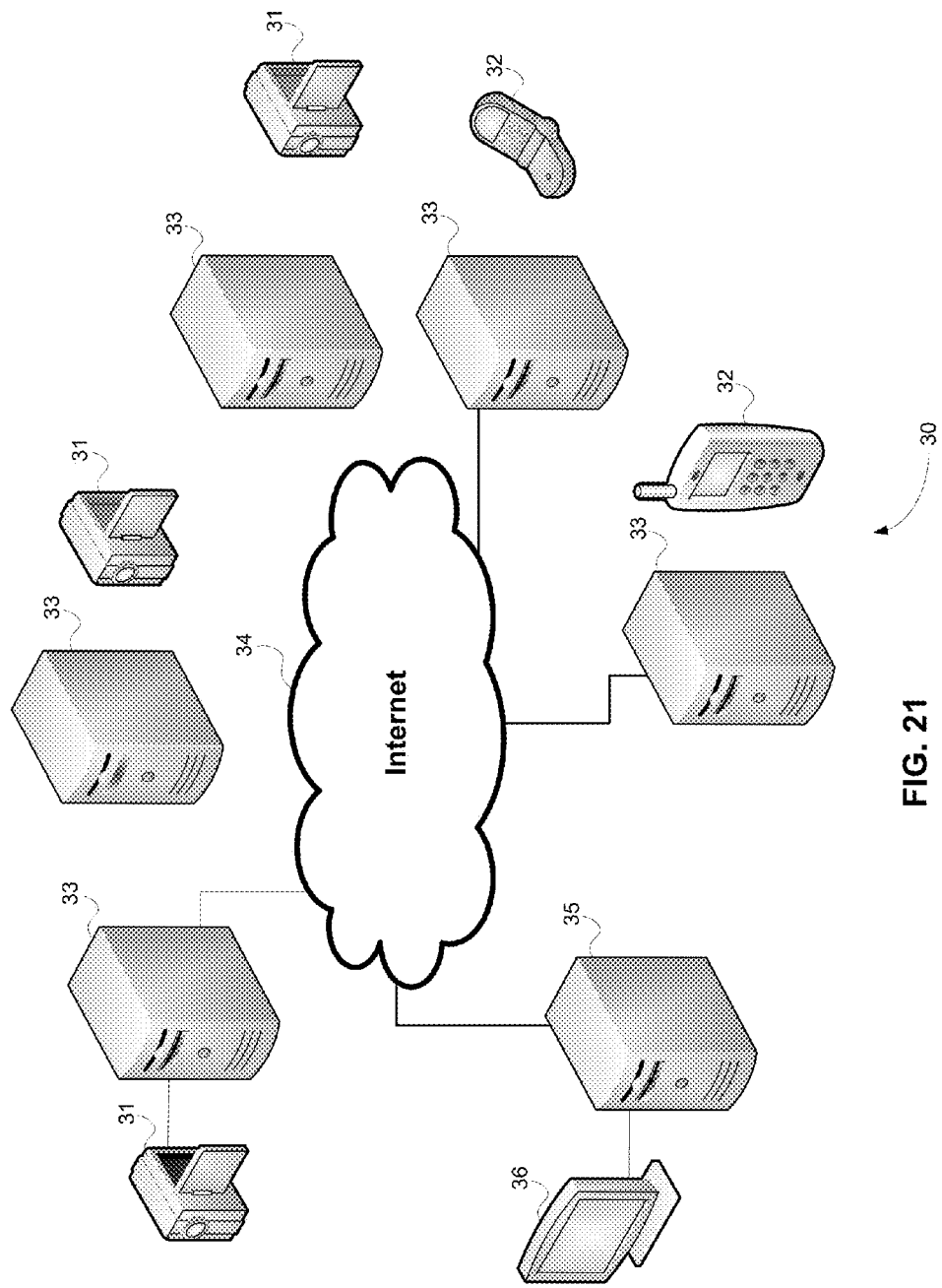
FIG. 21 is a pictorial representation of a system allowing composite panoramic movies to be generated according to the invention from multiple component sources.

FIG. 21 is a pictorial representation of a system 30 allowing composite panoramic movies to be generated according to the invention from multiple videos captured by multiple people. The system allows people to take videos at different locations using conventional cameras such as 31 or cellular telephones 32 having video features and to upload their videos over the Internet 34 to an application web server 35. The web server 35 is programmed according to the invention as described above to construct a panoramic model of the world by creating panoramic mosaics by stitching selected portions of the component videos and optionally to display the generated world model on a display device 36. Obviously, the captured video may be stored in a database and uploaded by users over the Internet.

In use of such a system, people located in different parts of the world capture component image sequences of the streets in their neighborhoods, their houses, their shops—whatever they wish. Once they upload to the web server 35 the component image sequences, software in the web server 35 analyzes the uploaded component videos, and computes the camera motion between frames. The image sequences may then be stored as an "aligned space time volume", with new intermediate frames optionally synthesized to create a denser image sequence.

The user can optionally upload together with the image data additional information of the sequence. This can include location information, e.g. GPS data of some of the frames, location on a map, e.g. an online map presented on the computer screen, street address, direction of camera (south, north, etc.), and more. Time information of capture may be sent, and also information about the camera. This information may be used to arrange the uploaded data in relation to some global map, and to other data uploaded by this or other users.

Once the data has been uploaded and processed, a user can access the data for a virtual walkthrough anywhere data is available. Using the appropriate slicing of the space time volume, as described in the X-Slits paper [23] or the stereo panorama patent [25], the user can transmit to the server his desired view, and the server 35 will compute the actual "slice" and send the generated image to the user. Alternatively, the user may be able to download from the server some portion of the space-time volume, and the image rendering can be performed locally on his computer.

It will be understood that although the use of X-Slits or stereo panoramic rendering is proposed, any image based rendering method may be employed. Camera motion can be computed either along one dimension or in two dimensions, and once the relative relation between input images is known, new images can be synthesized using familiar Image based Rendering methods, either on the web server or on the computers of users after downloading the image data.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention claimed is:

1. A computer-implemented method for forming a panoramic image of a scene from a sequence of input frames captured by a camera having an optical center that translates relative to the scene, said scene having at least two points at different distances from a path of said optical center, said method comprising:
   obtaining an optical flow between corresponding points in temporally different input frames;
   using said optical flow to compute flow statistics for a plurality of different portions of each of at least some of said input frames;
   using said optical flow to compute respective stitching costs between some of said portions and respective neighboring portions thereof;
   identifying a sequence of selected portions and respective neighboring portions that minimizes a cost function that is a function of the flow statistics and the stitching costs, wherein at least one portion is identified by selecting a cut configured to minimize the cost function, wherein the cut is through a volume comprising the sequence of input frames, and wherein a border section of the at least one portion corresponds to a border section of a respective neighboring portion; and
   stitching the selected portions and respective neighboring portions so as to form a panoramic image of the scene.

2. The method according to claim 1, wherein obtaining the optical flow includes computing the optical flow directly from the input frames.

3. The method according to claim 1, wherein obtaining the optical flow includes computing the optical flow from data indicative of motion of the camera and respective depth data of pixels in the input frames.

4. The method according to claim 1, including rectifying the optical flow by warping at least some of the input frames prior to computing the flow statistics and the stitching costs.

5. The method according to claim 1, including scaling at least some of the input frames according to the optical flow or depth data prior to computing the stitching costs.

6. The method according to claim 1, including normalizing the optical flow so as derive said depth data prior to computing the stitching costs.

7. The method according to claim 1, wherein at least one of said portions is defined by different strips of image data in two or more input frames.

8. The method according to claim 7, wherein the flow statistics include variance of optical flow in one of said strips.

9. The method according to claim 1, wherein stitching includes warping at least one of the selected portions.

10. The method according to claim 1, wherein the optical flow is estimated from previous frames or based on an arbitrary estimated optical flow.

11. The method according to claim 1, wherein the sequence of input frames is captured by more than one camera each having an optical center that translates relative to a different scene or a different region of a scene.

12. The method according to claim 11, including:
   capturing multiple video sequences by respective users at different locations;
   uploading the video sequences to a central server;
   using the uploaded video sequences to generate respective panoramic mosaics at the central server, and
   storing the panoramic mosaics for viewing over the Internet.

13. A machine-readable memory storing a computer program comprising computer program code means for performing the method of claim 1 when said program is run on a computer.

14. A system for forming a panoramic image of a scene from a sequence of input frames captured by a camera having an optical center that translates relative to the scene, said scene having at least two points at different distances from a path of said optical center, said system comprising:
   a memory for storing an optical flow between corresponding points in temporally different input frames;
   a processor coupled to said memory and responsive to said optical flow for computing flow statistics for a plurality of different portions of each of at least some of said input frames and for computing respective stitching costs between some of said portions and respective neighboring portions thereof;
   a selection unit coupled to the processor for selecting a sequence of portions and respective neighboring portions that minimizes a cost function that is a function of the flow statistics and the stitching costs, wherein at least one portion is selected by computing a cut configured to minimize the cost function, wherein the cut is through a volume comprising the sequence of input frames, and wherein a border section of the at least one portion corresponds to a border section of a respective neighboring portion; and
   a stitching unit coupled to the selection unit for stitching the selected portions and respective neighboring portions so as to form a panoramic image of the scene.

15. The system according to claim 14, further including a rectification unit coupled to the processor for rectifying the optical flow.

16. The system according to claim 15, wherein the rectification unit includes a pre-warping unit that warps at least some of the input frames.

17. The system according to claim 14, further including a scaling unit coupled to the processor for scaling at least some of the input frames according to the optical flow or depth data.

18. The system according to claim 14, further including a post-warping unit coupled to the selection unit for warping at least one of the selected portions.

19. The system according to claim 14, further including a display unit coupled to the stitching unit for displaying the panoramic image.

20. The system according to claim 14, including:
- a communications network for uploading to a central server respective video sequences captured by multiple cameras disposed at different locations, said central server being configured to generate from the uploaded video sequences respective panoramic mosaics and to store the panoramic mosaics for viewing over the communications network via one or more display devices.

* * * * *